(12) United States Patent
Shibata et al.

(10) Patent No.: US 8,197,384 B2
(45) Date of Patent: Jun. 12, 2012

(54) ENGINE START-UP DEVICE FOR HYBRID VEHICLE POWER TRANSMITTING DEVICE

(75) Inventors: Hiroyuki Shibata, Toyota (JP); Atsushi Tabata, Okazaki (JP); Tooru Matsubara, Toyota (JP); Kenta Kumazaki, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 903 days.

(21) Appl. No.: 12/216,578

(22) Filed: Jul. 8, 2008

(65) Prior Publication Data

US 2009/0017984 A1 Jan. 15, 2009

(30) Foreign Application Priority Data

Jul. 9, 2007 (JP) .................................. 2007-180211
Jul. 9, 2007 (JP) .................................. 2007-180212

(51) Int. Cl.
*B60K 1/02* (2006.01)
(52) U.S. Cl. .......................................................... 477/3
(58) Field of Classification Search .................. 477/3, 5, 477/150, 153
See application file for complete search history.

(56) References Cited

U.S. PATENT DOCUMENTS

| | | | | |
|---|---|---|---|---|
| 3,623,568 A | * | 11/1971 | Mori | 180/15 |
| 5,775,449 A | * | 7/1998 | Moroto et al. | 180/65.235 |
| 6,048,289 A | * | 4/2000 | Hattori et al. | 477/15 |
| 6,077,186 A | * | 6/2000 | Kojima et al. | 477/3 |
| 6,098,733 A | * | 8/2000 | Ibaraki et al. | 180/65.28 |
| 6,416,437 B2 | * | 7/2002 | Jung | 475/8 |
| 6,455,947 B1 | * | 9/2002 | Lilley et al. | 290/40 C |
| 6,516,253 B2 | * | 2/2003 | Boggs et al. | 701/20 |
| 6,554,736 B2 | * | 4/2003 | Takano et al. | 477/5 |
| 6,570,265 B1 | * | 5/2003 | Shiraishi et al. | 290/40 C |
| 6,726,592 B2 | * | 4/2004 | Kotani | 477/4 |
| 7,836,986 B1 | * | 11/2010 | Gillecriosd | 180/65.21 |
| 7,921,945 B2 | * | 4/2011 | Harris | 180/65.285 |
| 2003/0178953 A1 | | 9/2003 | Tumback et al. | |
| 2007/0114081 A1 | | 5/2007 | Iwanaka et al. | |
| 2008/0132379 A1 | | 6/2008 | Matsubara et al. | |

FOREIGN PATENT DOCUMENTS

| | | |
|---|---|---|
| JP | A-2003-127679 | 5/2003 |
| JP | A-2004-208417 | 7/2004 |
| JP | A-2005-264762 | 9/2005 |
| JP | A-2007-118697 | 5/2007 |

OTHER PUBLICATIONS

European Search Report issued in European Application No. EP 08 25 2344.0 dated Feb. 2, 2011.
Jul. 12, 2011 Office Action issued in corresponding Japanese Patent Application No. 2007-180212 (with translation).
May 19, 2001 Extended European Search Report issued in corresponding European Patent Application No. 08252344.0.

* cited by examiner

*Primary Examiner* — J. Allen Shriver, II
*Assistant Examiner* — James Triggs
(74) *Attorney, Agent, or Firm* — Oliff & Berridge, PLC

(57) ABSTRACT

With an engine start-up device, an engine is started upon altering a start-up when shifting an automatic shifting portion relative to when the automatic shifting portion is not shifting. Thus, start-up of the engine is prevented from adversely affecting the shifting of the automatic shifting portion. The engine starts during the shifting of the automatic shifting portion, enabling further improved response in acceleration required by a driver than that achieved when the operation is commenced after the automatic shifting portion has completed the shifting.

8 Claims, 17 Drawing Sheets

| | C1 | C2 | B1 | B2 | B3 | SHIFTING RATIO | STEP |
|---|---|---|---|---|---|---|---|
| 1st | ○ | | | | ○ | 3.357 | 1.54 |
| 2nd | ○ | | | ○ | | 2.180 | 1.53 |
| 3rd | ○ | | ○ | | | 1.424 | 1.42 |
| 4th | ○ | ○ | | | | 1.000 | TOTAL 3.36 |
| R | | ○ | | | ○ | 3.209 | |
| N | | | | | | | |

○ ENGAGED

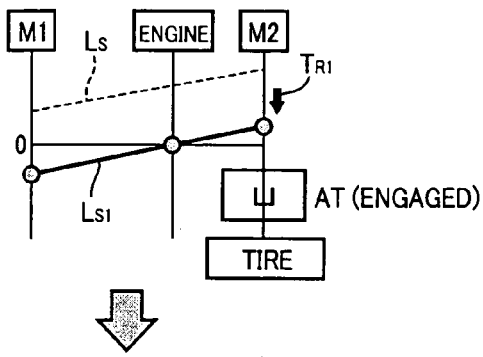
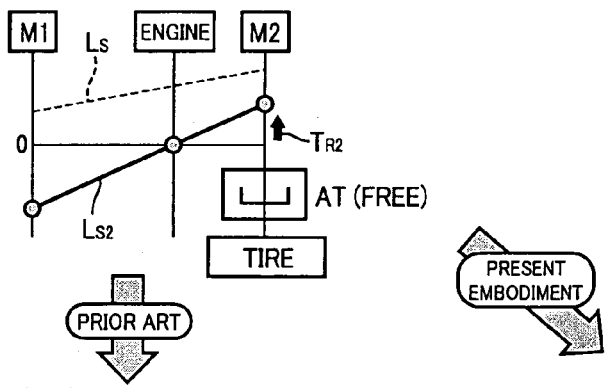
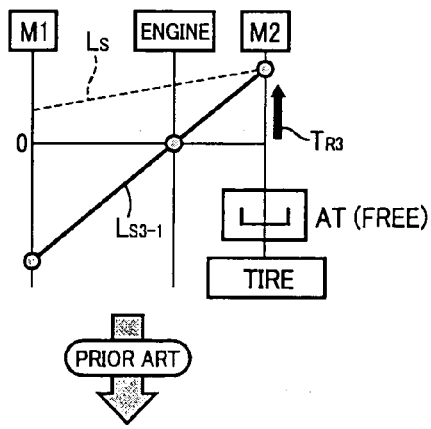
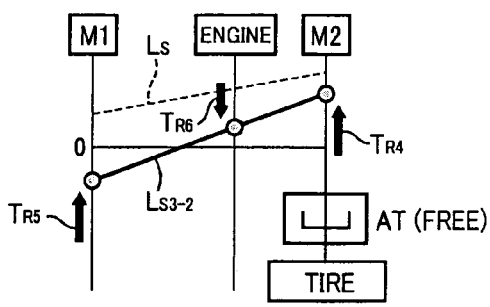
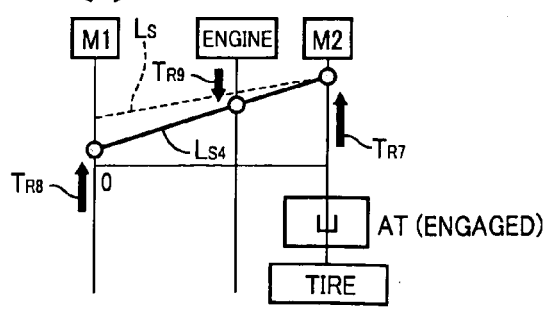
FIG.11

ENGINE START-UP DEVICE FOR HYBRID VEHICLE POWER TRANSMITTING DEVICE

BACKGROUND OF THE INVENTION

1. Field of the Invention

This invention relates to control devices for hybrid vehicle power transmitting devices. More particularly, it relates to a hybrid vehicle power transmitting device, including an engine, composed of an internal combustion engine serving as a drive power source to run a vehicle, and an electric motor, and a technology of starting up the engine during a switchover from a motor drive mode to an engine drive mode.

2. Description of the Related Art

In the related art, there has been known a hybrid vehicle drive device wherein drive torque, delivered from a main power source composed of an engine, a first electric motor and a differential mechanism, is transferred to drive wheels through an output shaft to which a second electric motor is connected via an automatic transmission. With such a hybrid vehicle drive device, a control device has heretofore been known in which a vehicle occupant is prevented from suffering an increasing shock due to the overlapping between a start-up shock of the engine and a shifting shock of the automatic transmission.

To this end, the shifting of the automatic transmission is interrupted during the execution of a control for starting up the engine to commence a shifting operation of the automatic transmission after the engine has been substantially started up. Such a control device for the hybrid vehicle drive device is disclosed in, for instance, Patent Publication 1 (Japanese Patent Application Publication 2004-208417).

Further, there has been known a control device for a hybrid vehicle power transmitting device including (i) a differential mechanism composed of a first rotary element connected to an engine, a second rotary element connected to a first electric motor and a third rotary element connected to a power transmitting path extending to drive wheels and a second electric motor, and (ii) an automatic shifting portion forming part of the power transmitting path extending from the differential mechanism to the drive wheels to function the an automatic transmission. Such a control device for the hybrid vehicle power transmitting device is disclosed in, for instance, Patent Publication 2 (Japanese Patent Application Publication 2005-264762). With such a control device for the hybrid vehicle power transmitting device, the operation was executed such that when starting up the engine, if the power transmitting path of the automatic shifting portion is interrupted with a vehicle remained halted, the first and second electric motors were caused to rotate in the same rotational direction to increase a rotation speed of the engine, after which the engine was started up.

Besides, another technology is disclosed in Patent Publication 3 (Japanese Patent Application Publication 2003-127679).

With the use of such a control device disclosed in Patent Publication 1, it takes a certain time between timing at which a shifting command is output to cause the shifting to be executed in the automatic transmission, and timing at which engaging elements of the automatic transmission are switched to complete a shifting operation. Meanwhile, the shifting of the automatic transmission is interrupted during the execution of the control for starting up the engine. Therefore, if there is a request for executing the shifting in response to a manipulation of a driver during a start-up control of the engine, the completion of the shifting is delayed with respect to the request on the shifting, with accompanying consequence of causing the driver to feel an increase delay in drive torque.

Further, during the motor drive mode with the vehicle driven by an output of the second electric motor while the engine was kept halted, there was a probability in that like a moment under which an accelerator pedal was deeply depressed during the shifting of the automatic shifting portion, the engine was required to start-up as early as possible. In such a moment, the increasing of the engine rotation speed for the start-up of the engine and the shifting operation of the automatic transmission were concurrently executed. This may occur for the first and second electric motors to operate under the same torque controls as those executed for the automatic shifting portion remaining under a non-shifting. During the non-shifting of the automatic shifting portion, there was a need for increasing or decreasing an input rotation speed of the automatic shifting portion for establishing the shifting therein. Thus, there was a likelihood of a difficulty being encountered in rapidly increasing the rotation speed of the engine.

However, the control device for the hybrid vehicle power transmitting device, disclosed in Patent Publication 2, had no particular consideration on the increasing of the rotation speed for the start-up of the engine and the shifting operation of the automatic shifting portion to be concurrently executed.

SUMMARY OF THE INVENTION

The present invention has been completed with the above views in mind and has a first object to provide a control device for a hybrid vehicle power transmitting device, having an engine and an electric motor, both serving as power sources to run a vehicle, which has quick response in drive torque requested by a driver during a changeover between a drive mode based on the electric motor, and a drive mode based on the engine.

The present invention has a second object to provide a control device for a hybrid vehicle power transmitting device having an engine and an electric motor both serving as power sources to run a vehicle, which can immediately perform an engine start-up during a changeover between a drive mode, based on the electric motor, and a drive mode based on the engine.

For achieving the first object of the present invention, a first aspect of the invention relates to an engine start-up device for a hybrid vehicle power transmitting device, wherein the hybrid vehicle power transmitting device comprises (i) an electrically controlled differential portion having a differential mechanism and controlling an operating state of a first electric motor connected to the differential mechanism in a power transmissive state for thereby controlling a differential state of the differential mechanism, (ii) a shifting portion forming part of a power transmitting path to function as an automatic transmission, and (iii) a second electric motor connected to the power transmitting path.

The engine start-up device alters a method of starting up an engine for the shifting portion executing a shifting relative to a method of starting up the engine for a non-shifting of the shifting portion.

In a second aspect of the invention, the electrically controlled differential portion has an input shaft to which the engine is connected in a power transmissive state; and during the non-shifting of the shifting portion, the engine start-up device causes a rotation speed of the engine for start-up thereof to increase by using either one of the first and second electric motors.

In a third aspect of the invention, during the shifting of the shifting portion, the engine start-up device causes the rotation speed of the engine for start-up thereof to increase by using both the first and second electric motors.

In a fourth aspect of the invention, the electrically controlled differential portion has an input shaft to which the engine is connected in a power transmissive state; and during the shifting of the shifting portion, the engine start-up device causes a rotation speed of the engine for start-up thereof to increase by using both the first and second electric motors.

A fifth aspect of the invention relates to an engine start-up device for a hybrid vehicle power transmitting device, wherein the hybrid vehicle power transmitting device comprises (i) an electrically controlled differential portion having a differential mechanism and controlling an operating state of a first electric motor connected to the differential mechanism in a power transmissive state for thereby controlling a differential state of the differential mechanism, (ii) a shifting portion forming part of a power transmitting path to function as an automatic transmission, and (iii) a second electric motor connected to the power transmitting path.

The engine start-up device alters an output torque of the second electric motor for a shifting executed in the shifting portion relative to the output torque of the second electric motor for a non-shifting of the shifting portion, when increasing a rotation speed of an engine for start-up thereof.

In a sixth aspect of the invention, during the shifting of the shifting portion, the engine start-up device causes the output torque of the second electric motor to be greater than that relevant to the non-shifting of the shifting portion.

In a seventh aspect of the invention, the engine start-up device causes the electrically controlled differential portion to operate as a continuously variable shifting mechanism upon controlling an operating state of the first electric motor.

For achieving the second object of the present invention, a eighth aspect of the invention relates to a control device for a hybrid vehicle power transmitting device, wherein the hybrid vehicle power transmitting device comprises (i) an electrically controlled differential portion including a differential mechanism, connected between an internal combustion engine and drive wheels, and a first electric motor connected to the differential mechanism in a power transmissive state and operative to control an operating state of the first electric motor for thereby controlling a differential state of the differential mechanism, and (ii) a shifting portion forming part of a power transmitting path.

The engine start-up device controls a drive force of the first electric motor for the internal combustion engine to be driven when increasing a rotation speed of the internal combustion engine for start-up thereof depending on a shifting state of the shifting portion.

In a ninth aspect of the invention, when increasing the rotation speed of the internal combustion engine for start-up thereof during the shifting of the shifting portion, the engine start-up device controls the drive force of the first electric motor based on an input rotation speed variation gradient, representing an absolute value of a variable range of an input rotation speed of the shifting portion per unit time.

In a tenth aspect of the invention, when increasing the rotation speed of the internal combustion engine for start-up thereof during the shifting of the shifting portion, the engine start-up device controls the drive controls force of the first electric motor such that a required time, for the internal combustion engine to be ignited after an increase beginning in the rotation speed of the internal combustion engine, approaches the required time during the non-shifting of the shifting portion.

In a eleventh aspect of the invention, when increasing the rotation speed of the internal combustion engine for start-up thereof during the shifting of the shifting portion, the engine start-up device controls the drive force of the first electric motor to be greater than that relevant to the non-shifting of the shifting portion.

In a twelfth aspect of the invention when increasing the rotation speed of the internal combustion engine for start-up thereof during the shifting of the shifting portion, the engine start-up device alters a shifting control of the shifting portion when the drive force of the first electric motor is limited relative to that in which no drive force is limited.

In a thirteenth aspect of the invention, when increasing the rotation speed of the internal combustion engine for start-up thereof during the shifting of the shifting portion, the engine start-up device alters the drive force of the first electric motor relative to that generated during the non-shifting of the shifting portion, as long as the rotation speed of the internal combustion engine falls in a range of a resonating frequency band, representing a rotation speed range of the internal combustion engine in which a vibration resulting from a rotation of the internal combustion engine is amplified due to a resonation.

In a fourteenth aspect of the invention, the hybrid vehicle power transmitting device further comprises a second electric motor connected to the power transmitting path; and when increasing the rotation speed of the internal combustion engine for start-up thereof, the engine start-up device controls a drive force of the second electric motor depending on a shifting state of the shifting portion to provide a reactive force in opposition to the drive force of the first electric motor.

In a fifteenth aspect of the invention when increasing the rotation speed of the internal combustion engine for start-up thereof during the shifting of the shifting portion, the engine start-up device controls the drive force of the second electric motor depending on an input rotation speed variation gradient, representing an absolute value of a variable range of an input rotation speed of the shifting portion per unit time.

In a sixteenth aspect of the invention, when increasing the rotation speed of the internal combustion engine for start-up thereof during the shifting of the shifting portion, the engine start-up device controls the drive force of the second electric motor to be greater than that relevant to the non-shifting of the shifting portion.

In a seventeenth aspect of the invention, when increasing the rotation speed of the internal combustion engine for start-up thereof during the shifting of the shifting portion, the engine start-up device alters a shifting control executed in the shifting portion for a limited drive force of the first electric motor relative to a shifting control executed for the limited drive force being absent.

In a eighteenth aspect of the invention, when increasing the rotation speed of the internal combustion engine for start-up thereof during the shifting of the shifting portion, the engine start-up device alters the drive force of the second electric motor generated when the rotation speed of the internal combustion engine falls in the range of the resonating frequency band representing the rotation speed range with a vibration caused by the rotating internal combustion engine, relative to that generated during the non-shifting of the shifting portion.

The present invention has various advantageous effects as will be described below.

With the first aspect of the invention, the starting up method the engine for the shifting of the shifting portion is altered relative to the starting up method the engine for the non-shifting of the shifting portion. This can prevent an operation to start-up the engine from adversely affecting the shifting of the shifting portion. In addition, due to a capability of beginning the operation to start-up the engine during the shifting of the shifting portion, such an operation is commenced after the shifting has been completed. In such a case, the shifting portion can have quicker response in acceleration at a request of a driver than that achieved in a case where such an operation and the shifting are not concurrently executed.

Further, preferably, the shifting portion may include a step-variable type transmission. More preferably, as used herein, the term "method of starting up an engine" may refer to a method of increasing a rotation speed of the engine for starting up the engine.

With the second aspect of the invention, during the non-shifting of the shifting portion, the rotation speed of the engine for start-up thereof is caused to increase by using either one of the first and second electric motors. This allows the control to be executed for increasing the rotation speed of the engine on an easier stage than that in which the control is executed when using both of the first and second electric motors, enabling a reduction in control load of the control device during the non-shifting of the shifting portion.

With the third aspect of the invention, during the shifting of the shifting portion, the rotation speed of the engine for start-up thereof is caused to increase upon using both the first and second electric motors. This can increase the rotation speed of the engine for start-up thereof during the shifting of the shifting portion. This result in starting up the engine on an earlier stage to provide improved response on the acceleration required by the driver. Meanwhile, during the non-shifting of the shifting portion, using either of one of the first and second electric motors enables an increase in the rotation speed of the engine for start-up thereof, enabling a reduction in control load of the control device during the non-shifting of the shifting portion.

More preferably, during the motor drive mode in which no output is generated from the engine and the second electric motor is used as a drive power source to run a hybrid vehicle, the rotation speed of the engine for start-up thereof can be caused to increase.

More preferably, when increasing the rotation speed of the engine for start-up thereof using both the first and second electric motors, the first and second electric motors are caused to rotate in a common direction in which the engine is caused to rotate.

With the fourth aspect of the invention, during the shifting of the shifting portion, the rotation speed of the engine for start-up thereof is caused to increase by using both the first and second electric motors. This can increase the rotation speed of the engine for start-up thereof during the shifting of the shifting portion. This result in starting up the engine on an earlier stage to provide improved response on the acceleration required by the driver.

With the fifth aspect of the invention, when increasing the rotation speed of the engine for start-up thereof output torque of the second electric motor for the shifting of the shifting portion relative to output torque of the second electric motor for the non-shifting of the shifting portion. This results in avoiding the operation to start-up the engine from adversely affecting the shifting of the shifting portion. In addition, due to a capability of beginning the operation to start-up the engine during the shifting of the shifting portion, such an operation is commenced after the shifting has been completed. In such a case, the shifting portion can have quicker response in acceleration at the request of the driver than that achieved in the case where such an operation and the shifting are not concurrently executed.

With the first aspect of the invention the invention recited in claim 6, during the shifting of the shifting portion, output torque of the second electric motor is caused to be greater than that relevant to the non-shifting of the shifting portion. This can increase the rotation speed of the engine for start-up thereof during the shifting of the shifting portion. This result in improved response on the acceleration required by the driver.

More preferably, output torque of the second electric motor for increasing the rotation speed of the engine for start-up thereof during the shifting of the shifting portion is reactive torque for sustaining the input rotation speed of the shifting portion for establishing the shifting portion in opposition to rotational resistance of the engine.

With the seventh aspect of the invention, the electrically controlled differential portion is caused to operate as the continuously variable shifting mechanism upon controlling the operating state of the first electric motor. This can smoothly vary drive torque output from the electrically controlled differential portion. Further, the electrically controlled differential portion is rendered operative as an electrically controlled continuously variable transmission upon continuously varying a speed ratio, in addition to a step-variable transmission upon varying the speed ratio step-by-step.

With the eighth aspect of the invention, when increasing the rotation speed of the internal combustion engine for start-up thereof, the drive force of the first electric motor for the internal combustion engine to be driven is controlled depending on the shifting state of the shifting portion. This results in a reduced adverse affect of the shifting operation of the shifting portion on an increase in the rotation speed of the internal combustion engine. In starting up the internal combustion engine, the rotation speed of the internal combustion engine is caused to increase even during the shifting of the shifting portion, enabling the internal combustion engine to be properly started up.

More preferably, when increasing the rotation speed of the internal combustion engine for start-up thereof, the drive force of the first electric motor for the internal combustion engine to be driven is controlled depending on a variable range of the speed ratio to be achieved in the shifting portion.

With the ninth aspect of the invention, when increasing the rotation speed of the internal combustion engine for start-up thereof during the shifting of the shifting portion, the drive force of the first electric motor is controlled based on the input rotation speed variation gradient representing the absolute value of the variable range of the input rotation speed of the shifting portion per unit time. This results in an increased variation in the input rotation speed of the shifting portion, with accompanying increase in the drive force of the first electric motor required for increasing the rotation speed of the internal combustion engine. Even in such a case, the rotation speed of the internal combustion engine can be rapidly increased, properly starting-up the internal combustion engine.

More preferably, the control is performed such that the greater the input rotation speed variation gradient increases, the greater will be the drive force of the first electric motor.

With the tenth aspect of the invention, when increasing the rotation speed of the internal combustion engine for start-up thereof during the shifting of the shifting portion, the drive force of the first electric motor is controlled such that the required time, for the internal combustion engine to be ignited after the beginning of the increase in the rotation speed of the internal combustion engine, approaches the required time during the non-shifting of the shifting portion. This enables the internal combustion engine to be started up with same response as that appearing during the non-shifting of the shifting portion.

With the eleventh aspect of the invention, when increasing the rotation speed of the internal combustion engine for start-up thereof during the shifting of the shifting portion, the drive force of the first electric motor is controlled to be greater than that relevant to the non-shifting of the shifting portion. Thus, even if a variation occurs in the rotation speed of the shifting portion due to the presence of the shifting of the shifting portion, the rotation speed of the internal combustion engine can be rapidly increased, thereby enabling the internal combustion engine to be properly started up.

With the twelfth aspect of the invention, when increasing the rotation speed of the internal combustion engine for start-up thereof during the shifting of the shifting portion, the drive force of the first electric motor is limited. In such a case, the shifting control of the shifting portion is altered relative to that in which no drive force is limited. Thus, the variation in the input rotation speed of the shifting portion has less adverse affect on the increase in the rotation speed of the internal combustion engine than that appearing when no shifting control is altered.

More preferably, the shifting control of the shifting portion is altered such that the greater the limitation in the drive force of the first electric motor, i.e. the lower the drive force available to be output from the first electric motor, the smaller will be the input rotation speed variation gradient of the shifting portion.

More preferably, further, the shifting control of the shifting portion is altered such that the greater the limitation in the drive force of the first electric motor, i.e. the lower the drive force available to be output from the first electric motor, the longer will be the shifting time needed in the shifting portion.

More preferably, the expression "the drive force of the first electric motor is limited" means the fact that a predetermined drive force is unavailable to be output from the first electric motor.

With the thirteenth aspect of the invention, when increasing the rotation speed of the internal combustion engine for start-up thereof during the shifting of the shifting portion, the rotation speed of the internal combustion engine may fall in the resonating frequency band range in which the vibration caused by the rotation of the internal combustion engine is amplified due to the resonation. In such a case, the drive force of the first electric motor is altered relative to that generated during the non-shifting of the shifting portion. This can rapidly pass the rotation speed of the internal combustion engine across the resonating frequency band, enabling a reduction in the occurrence of damage to comfort of the driver due to the presence of the vibration caused at the start-up of the internal combustion engine.

More preferably, during a period in which the rotation speed of the internal combustion engine remains in the range of the resonating frequency band, the drive force of the first electric motor is altered to be greater than that generated during the non-shifting of the shifting portion.

With the fourteenth aspect of the invention, when increasing the rotation speed of the internal combustion engine for start-up thereof, the drive force of the second electric motor is controlled depending on the shifting state of the shifting portion to provide the reactive force in opposition to the drive force of the first electric motor. This results in preventing rotational resistance of the internal combustion engine from adversely affecting the shifting operation of the shifting portion. When starting up the internal combustion engine, for instance, the rotation speed of the internal combustion engine can be rapidly increased even during the shifting of the shifting portion, enabling the internal combustion engine to be properly started up.

More preferably, when increasing the rotation speed of the internal combustion engine for start-up thereof, the drive force of the second electric motor is controlled depending on a variable range in speed ratio of the shifting portion to provide the reactive force in opposition to the drive force of the first electric motor.

With the fifteenth aspect of the invention, when increasing the rotation speed of the internal combustion engine for start-up thereof during the shifting of the shifting portion, the drive force of the second electric motor is controlled depending on the input rotation speed variation gradient. The variation in the input rotation speed of the shifting portion increases, with an accompanying increase in the drive force of the second electric motor needed for counteracting rotational resistance of the internal combustion engine and the drive force of the first electric motor. Even in such a case, an adverse affect of rotational resistance of the internal combustion engine on the shifting operation of the shifting portion can be eliminated. This allows the rotation speed of the internal combustion engine to rapidly increase, properly starting-up the internal combustion engine.

More preferably, further, the control is performed such that the greater the input rotation speed variation gradient, the greater will be the drive force of the second electric motor.

With the sixteenth aspect of the invention, when increasing the rotation speed of the internal combustion engine for start-up thereof during the shifting of the shifting portion, the drive force of the second electric motor is controlled to be greater than that relevant to the non-shifting of the shifting portion. Therefore, even if a need arises to vary the input rotation speed of the shifting portion for establishing the shifting operation of the shifting portion, an adverse affect of rotational resistance of the internal combustion engine on the shifting operation of the shifting portion can be eliminated. Thus, the internal combustion engine can be properly started up.

With the seventeenth aspect of the invention, when increasing the rotation speed of the internal combustion engine for start-up thereof during the shifting of the shifting portion, the shifting control executed in the shifting portion for the limited drive force of the first electric motor, is altered relative to the shifting control executed for the limited drive force being absent. This enables a further reduction in adverse affect of the variation in input rotation speed of the shifting portion on the increase in the rotation speed of the internal combustion engine than that achieved when no shifting control is altered.

More preferably, the shifting control of the shifting portion is altered such that the greater the limitation in the drive force of the second electric motor, i.e. the smaller the drive force available to be output from the second electric motor, the longer will be the shifting time in the shifting portion.

More preferably, further, a situation under which "the drive force of the second electric motor is limited" represents a case under which no predetermined drive force is obtained from the second electric motor.

With the eighteenth aspect of the invention, when increasing the rotation speed of the internal combustion engine for start-up thereof during the shifting of the shifting portion, the drive force of the second electric motor generated when the rotation speed of the internal combustion engine falls in the range of the resonating frequency band, is altered relative to that generated during the non-shifting of the shifting portion. This allows the rotation speed of the internal combustion engine to rapidly pass across the resonating frequency band, enabling a reduction in damage to a comfort of the driver caused by the vibration occurring at the start-up of the internal combustion engine.

More preferably, the drive force of the second electric motor, generated when the rotation speed of the internal combustion engine falls in the range of the resonating frequency band, is altered to be greater than that generated during the non-shifting of the shifting portion.

More preferably, when increasing the rotation speed of the internal combustion engine for start-up thereof during the shifting of the shifting portion, the first electric motor is drivably rotated in the same rotational direction as that in which the second electric motor rotates, with accompanying rotation of the internal combustion engine in the same rotational direction as those of the first and second electric motors.

More preferably, (a) the hybrid vehicle power transmitting device includes a differential action limiting device operative to limit or interrupt a differential action of the differential mechanism. With such a structure, (b) when increasing the rotation speed of the internal combustion engine for start-up thereof, the differential action limiting device limits or interrupts the differential action of the differential mechanism. This allows either one of or both of a reverse drive force, transmitted from the drive wheel to the internal combustion engine during a running of a vehicle, and the drive force of the second electric motor to increase the rotation speed of the internal combustion engine. In this case, the rotation speed of the internal combustion engine can be increased without causing the first electric motor to provide output torque.

BRIEF DESCRIPTION OF THE DRAWINGS

FIG. 11 is a collinear chart illustrating relative rotation speeds of a first electric motor, an engine and a second electric motor in respective periods [1] to [4] and [4'] plotted on a time axis (on a horizontal line) in FIG. 10.

DETAILED DESCRIPTION OF THE PREFERRED EMBODIMENTS

Now, various embodiments according to the present invention will be described below in detail with reference to the accompanying drawings.

First Embodiment

Figures 1, 2:
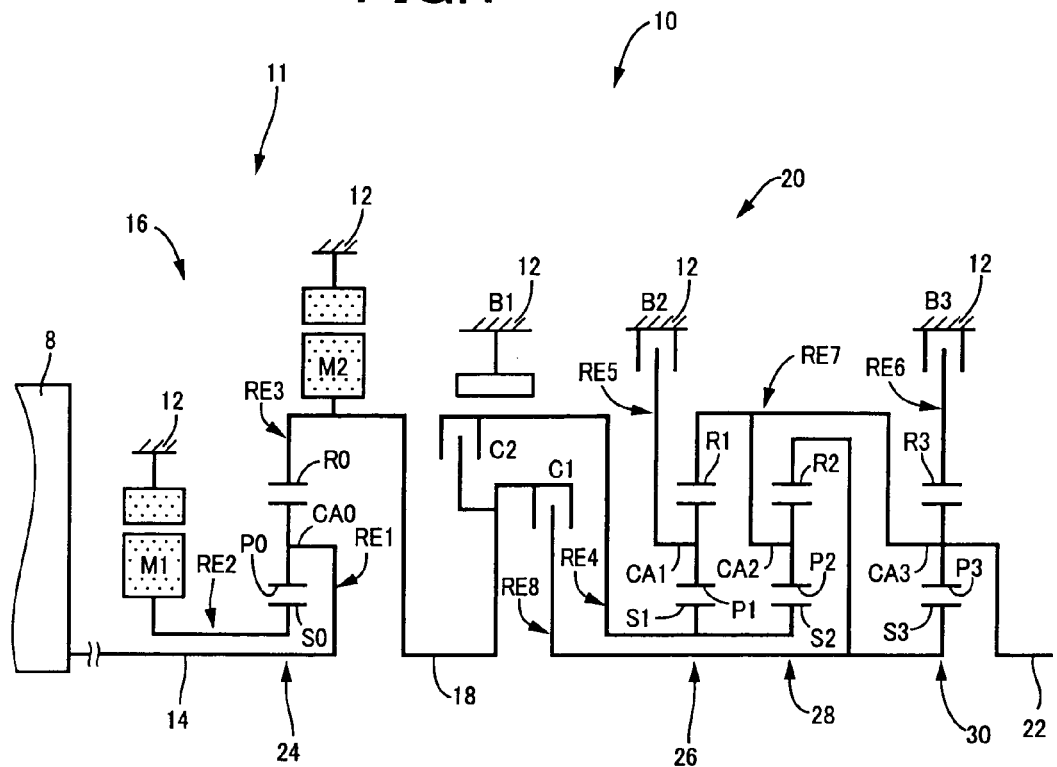
FIG. 1 is a skeleton diagram showing structure of an engine start-up device for a hybrid vehicle power transmitting device to which an electronic control unit of the present invention is applied.
FIG. 2 is a functional diagram illustrating combined operations of hydraulically operated frictional coupling devices for use in an automatic shifting portion provided in the hybrid vehicle power transmitting device shown in FIG. 1.

FIG. 1 is a skeleton diagram for illustrating a transmission mechanism i.e., shifting mechanism 10 constituting a part of a hybrid vehicle power transmitting device to which the present invention is applied. As shown in FIG. 1, the transmission mechanism 10 includes a transmission case 12 (hereinafter referred to as "a case 12") mounted on a vehicle body as a non-rotary member, an input shaft 14 disposed inside the case 12 as an input rotary member, a differential portion 11 coaxially connected to the input shaft 14 either directly, or indirectly via a pulsation absorbing damper (vibration damping device), not shown, and serving as a continuously variable transmission portion, an automatic transmission portion 20 connected in series in a power transmitting path between the differential portion 11 and drive wheels 34 (see FIG. 6) through a power transmitting member 18 (power transmitting shaft), and an output shaft 22 connected to the automatic transmission portion 20 and serving as an output rotary member.

The transmission mechanism 10 is suitably applied to an FR (front-engine and reverse-drive) type vehicle and mounted on a vehicle along a fore and aft direction thereof. The transmission mechanism 10 is disposed between an engine 8 and a pair of drive wheels 34. The engine 8 includes an internal combustion engine such as a gasoline engine or a diesel engine or the like and serves as a drive-power source. The engine 8 is directly connected to the input shaft 12 in series or indirectly through the pulsation absorbing damper (vibration damping device), not shown. This allows a vehicle drive force to be transferred from the engine 8 to the pair of drive wheels 34 in sequence through a differential gear device 32 (final speed reduction gear) (see FIG. 6) and a pair of drive axles.

With the transmission mechanism 10 of the illustrated embodiment, the engine 8 and the differential portion 11 are directly connected to each other. As used herein, the term "directly connected to each other" refers to a structure under which a direct connection is established between the associated component parts in the absence of a fluid-operated power transmitting device, such as a torque converter or a fluid coupling device or the like, and a connection including, for instance, the pulsation absorbing damper is involved in such a direction connection. It is noted that a lower half of the transmission mechanism 10, which is constructed symmetrically with respect to its axis, is omitted in FIG. 1. This is also true for the other embodiments of the invention described below.

The differential portion 11 can be said as the electrically controlled differential portion having the structure in which the differential state is changed using the first electric motor M1. It includes a first electric motor M1, a power distributing mechanism 16, structured in a mechanical mechanism for mechanically distributing an output of the engine 8 applied to the input shaft 14, which functions as a differential mechanism through which the engine output is distributed to the first electric motor M1 and the power transmitting member 18, and a second electric motor M2 operatively connected to the power transmitting member 18 to be unitarily rotate therewith. In the illustrated embodiment, both the first and second electric motors M1 and M2 are so-called motor/generators each having a function to generate electric power. The first electric motor M1 has at least a function as an electric power generator for generating a reaction force. The second electric motor M2 has at least a function as a motor (electric motor) serving as a running drive power source to output a vehicle drive force.

The power distributing mechanism 16 corresponding to the claimed differential mechanism includes, as a major component, a differential portion planetary gear set 24 of a single pinion type having a gear ratio $\rho 0$ of about 0.418, for example. The differential portion planetary gear set 24 has rotary elements (elements) composed of a differential portion sun gear S0, a differential portion planetary gear P0, a differential portion carrier CA0 supporting the differential portion planetary gear P0 such that the differential portion planetary gear P0 is rotatable about its axis and about the axis of the differential portion sun gear S0, and a differential portion ring gear R0 meshing with the differential portion sun gear S0 through the differential portion planetary gear P0. Where the numbers of teeth of the differential portion sun gear S0 and the differential portion ring gear R0 are represented by ZS0 and ZR0, respectively, the above gear ratio $\rho 0$ is represented by ZS0/ZR0.

With the power distributing mechanism 16, a differential portion carrier CA0 is connected to the input shaft 14, i.e., the engine 8; a differential portion sun gear S0 is connected to the first electric motor M1; and a differential portion ring gear R0 is connected to the power transmitting member 18. With the power distributing mechanism 16 of such a structure, the three elements of the differential portion planetary gear set 24, i.e., the differential portion sun gear S0, the differential portion carrier CA0 and the differential portion ring gear R0 are arranged to rotate relative to each other for initiating a differential action, i.e., in a differential state under which the differential action is initiated. This allows the engine output to be distributed to the first electric motor M1 and the power transmitting mechanism 18. Then, a part of the distributed engine output drives the first electric motor M1 to generate electric energy, which is stored and used for rotatably driving the second electric motor M2. Thus, the differential portion 11 (power distributing mechanism 16) is caused to function as an electric differential device such that, for instance, the differential portion 11 is placed in a so-called continuously variable shifting state (electrically established CVT state) to continuously vary the rotation of the power transmitting member 18 regardless of the engine 8 operating at a given rotational speed.

That is, the differential portion 11 functions as an electrically controlled continuously variable transmission to provide a speed ratio $\gamma 0$ (rotational speed $N_{IN}$ of the input shaft 14/rotational speed $N_{18}$ of the power transmitting member 18) that is continuously variable from a minimum value $\gamma 0 min$ to a maximum value $\gamma 0 max$. In this way, controlling the driving conditions of the first and second electric motors M1 and M2 and the engine 8 all connected to the power distributing mechanism 16 (differential portion 11) controls the differential state between the rotation speeds between the input shaft 14 and the transmitting member 18.

The automatic transmission portion 20 corresponding to the claimed shifting portion forms a part of the power transmitting path extending from the differential portion 11 to the drive wheels 38 and includes a single-pinion type first planetary gear set 26, a single-pinion type second planetary gear set 28 and a single-pinion type third planetary gear set 30. The automatic transmission portion 20 is a planetary gear type multiple-step transmission operable as a step-variable automatic transmission. The first planetary gear set 26 has a first sun gear S1; a first planetary gear P1; a first carrier CA1 supporting the first planetary gear P1 such that the first planetary gear P1 is rotatable about its axis and about the axis of the first sun gear S1; and a first ring gear R1 meshing with the first sun gear S1 through the first planetary gear P1. For example, the first planetary gear set 26 has a given gear ratio ρ1 of about "0.562".

The second planetary gear set 28 has a second sun gear S2; a second planetary gear P2; a second carrier CA2 supporting the second planetary gear P2 such that the second planetary gear P2 is rotatable about its axis and about the axis of the second sun gear S2; and a second ring gear R2 meshing with the second sun gear S2 through the second planetary gear P2. For example, the second planetary gear set 28 has a given gear ratio ρ2 of about "0.425".

The third planetary gear set 30 has: a third sun gear S3; a third planetary gear P3; a third carrier CA3 supporting the third planetary gear P3 such that the third planetary gear P3 is rotatable about its axis and about the axis of the third sun gear S3; and a third ring gear R3 meshing with the third sun gear S3 through the third planetary gear P3. For example, the third planetary gear set 30 has a given gear ratio ρ3 of, for instance, about "0.421". With the first sun gear S1, first ring gear R1, second sun gear S2, second ring gear R2, third sun gear S3 and third ring gear R3 having the numbers of gear teeth represented by ZS1, ZR1, ZS2, ZR2, ZS3 and ZR3, respectively, the gear ratios ρ1, ρ2 and ρ3 are expressed by ZS1/ZR1, ZS2/ZR2, and ZS3/ZR3, respectively.

In the automatic transmission portion 20, the first and second sun gears S1, S2 are integrally connected to each other, selectively connected to the power transmitting member 18 through a second clutch C2, and selectively connected to the casing 12 through a first brake B1. The first carrier CA1 is selectively connected to the casing 12 through a second brake B2, and the third ring gear R3 is selectively connected to the casing 12 through a third brake B3. The first ring gear R1, second carrier CA2 and third carrier CA3 are integrally connected to each other and connected to the output shaft 22. The second ring gear R2 and the third sun gear S3 are integrally connected to each other and selectively connected to the power transmitting member 18 through a first clutch C1.

Thus, the automatic transmission portion 20 and the differential portion 11 (power transmitting member 18) are selectively connected to each other through the first clutch C1 or the second clutch C2, which is provided to establish each gear position (shift gear position) in the automatic transmission portion 20. In other words, the first and second clutches C1, C2 function as coupling devices. i.e., engaging device operable to place the power transmitting path between the power transmitting member 18 and the automatic transmission portion 20, that is, the power transmitting path between the differential portion 11 (power transmitting member 18) and the drive wheels 34, selectively in one of a power transmitting state in which the vehicle drive force can be transmitted through the power transmitting path, and the power cut-off state in which the vehicle drive force cannot be transmitted through the power transmitting path.

That is, with at least one of the first and second clutches C1 and C2 brought into coupling engagement, the power transmitting path is placed in the power transmitting state. In contrast, uncoupling both the first and second clutches C1 and C2 places the power transmitting path in the power cut-off state.

With the automatic transmission portion 20, further, uncoupling an on-uncoupling side coupling device while coupling an on-coupling side coupling device allows a so-called "clutch-to-clutch" shifting action to be executed for respective gear positions to be selectively established. This allows a speed ratio γ (rotational speed $N_{18}$ of the power transmitting member 18/rotational speed $N_{OUT}$ of the output shaft 22) to be obtained in equally varying ratio for each gear position. As indicated in the coupling operation table shown in FIG. 2, coupling the first clutch C1 and third brake B3 establishes 1st-speed gear position having a speed ratio γ1 of approximately, for instance, "3.357". With the first clutch C1 and second brake B3 coupled in operation, a 2nd-speed gear position is established with a speed ratio γ2 of, for instance, approximately "2.180", which is lower a value of the speed ratio γ1.

With the first clutch C1 and first brake B1 coupled in operation, a 3rd-speed gear position is established with a speed ratio γ3 of, for instance, approximately "1.424", which is lower a value of the speed ratio γ2. Coupling the first clutch C1 and second clutch C2 establishes a 4th-speed gear position with a speed ratio γ4 of, for instance, approximately "1.000", which is lower than the speed ratio γ3. Coupling the second clutch C2 and third brake B3 establishes a reverse-drive gear position (reverse-drive shift position) with a speed ratio γR of, for instance, approximately 3.209, which is intermediate between those of the 1st-speed gear position and the 2nd-speed gear position. In addition, uncoupling i.e., disengaging or releasing the first clutch C1, second clutch C2, first brake B1, second brake B2 and third brake B3 allows a neutral position N to be established.

The first clutch C1, second clutch C2, first brake B1, second brake B2 and third brake B3 (hereinafter collectively referred to as clutch C and brake B, unless otherwise specified) are hydraulically operated frictional coupling devices that are used in the related art vehicular automatic transmission. Each of these frictional coupling devices may include a wet-type multiple-disc clutch, having a plurality of mutually overlapping friction plates adapted to be pressurized against each other by a hydraulic actuator, or a band brake including a rotary drum having an outer circumferential surface on which one band or two bands are wound with terminal ends being adapted to be tightened by a hydraulic actuator. Thus, the frictional coupling device serves to selectively provide a drive connection between two component parts between which each clutch or brake is interposed.

With the transmission mechanism 10 of such a structure, the differential portion 11, serving as the continuously variable transmission, and the automatic transmission portion 20 constitute a continuously variable transmission. Further, with the differential portion 11 controlled so as to provide a speed ratio kept at a fixed level, the differential portion 11 and the automatic transmission portion 20 can provide the same state as that of a step-variable transmission.

More particularly, the differential portion 11 functions as the continuously variable transmission, and the automatic transmission portion 20 connected to the differential portion 11 in series functions as the step-variable transmission. Thus, the rotational speed, input to the automatic transmission portion 20 placed for at least one gear position M, (hereinafter referred to as "input rotational speed of the automatic transmission portion 20"), i.e., the rotational speed of the power transmitting member 18 (hereinafter referred to as "transmitting-member rotational speed $N_{18}$") are caused to continuously vary, thereby enabling the gear position M to have a continuously variable speed range. Accordingly, the transmission mechanism 10 provides an overall speed ratio γT (rotational speed $N_{IN}$ of the input shaft 14/rotational speed $N_{OUT}$ of the output shaft 22) in a continuously variable range.

Thus, the continuously variable transmission is established in the transmission mechanism 10. The overall speed ratio γT of the transmission mechanism 10 is the total speed ratio γT of a whole of the automatic transmission portion 20 that is established based on the speed ratio γ0 of the differential portion 11 and the speed ratio γ of the automatic transmission portion 20.

For the respective gear positions such as, for instance, the 1st-speed to 4th-speed gear positions of the automatic transmission portion 20 and the reverse-drive gear position as indicated in the coupling operation table shown in FIG. 2, the transmitting-member rotational speed $N_{18}$ is continuously varied with each gear position being obtained in a continuously variable speed range. Accordingly, a continuously variable speed ratio is present between adjacent gear positions, enabling the whole of the transmission mechanism 10 to have the total speed ratio γT in a continuously variable range.

Further, the speed ratio γ0 of the differential portion 11 is controlled so as to lay at a fixed level and the clutch C and brake B are selectively coupled, thereby causing either one of the 1st-speed to 4th-speed gear positions or the reverse-drive gear position (reverse-drive shift position) to be selectively established. This allows the overall speed ratio γT, variable in a nearly equal ratio, of the transmission mechanism 10 to be obtained for each gear position. Thus, the transmission mechanism 10 can be established in the same state as that of the step-variable transmission.

If, for instance, the differential portion 11 is controlled so as to provide the speed ratio γ0 at a fixed value of "1", the transmission mechanism 10 provides the total speed ratio γT for each gear position of the 1st-speed to 4th-speed gear positions of the automatic transmission portion 20 and the reverse-drive gear position as indicated by the coupling operation table shown in FIG. 2. Further, if the automatic transmission portion 20 is controlled under the 4th-speed gear position so as to cause the differential portion 11 to have the speed ratio γ0 of approximately, for instance, "0.7" less than a value of "1", the automatic transmission portion 20 has the total speed ratio γT of approximately, for instance, "0.7" that is less than a value of the 4th-speed gear position.

Figure 3:
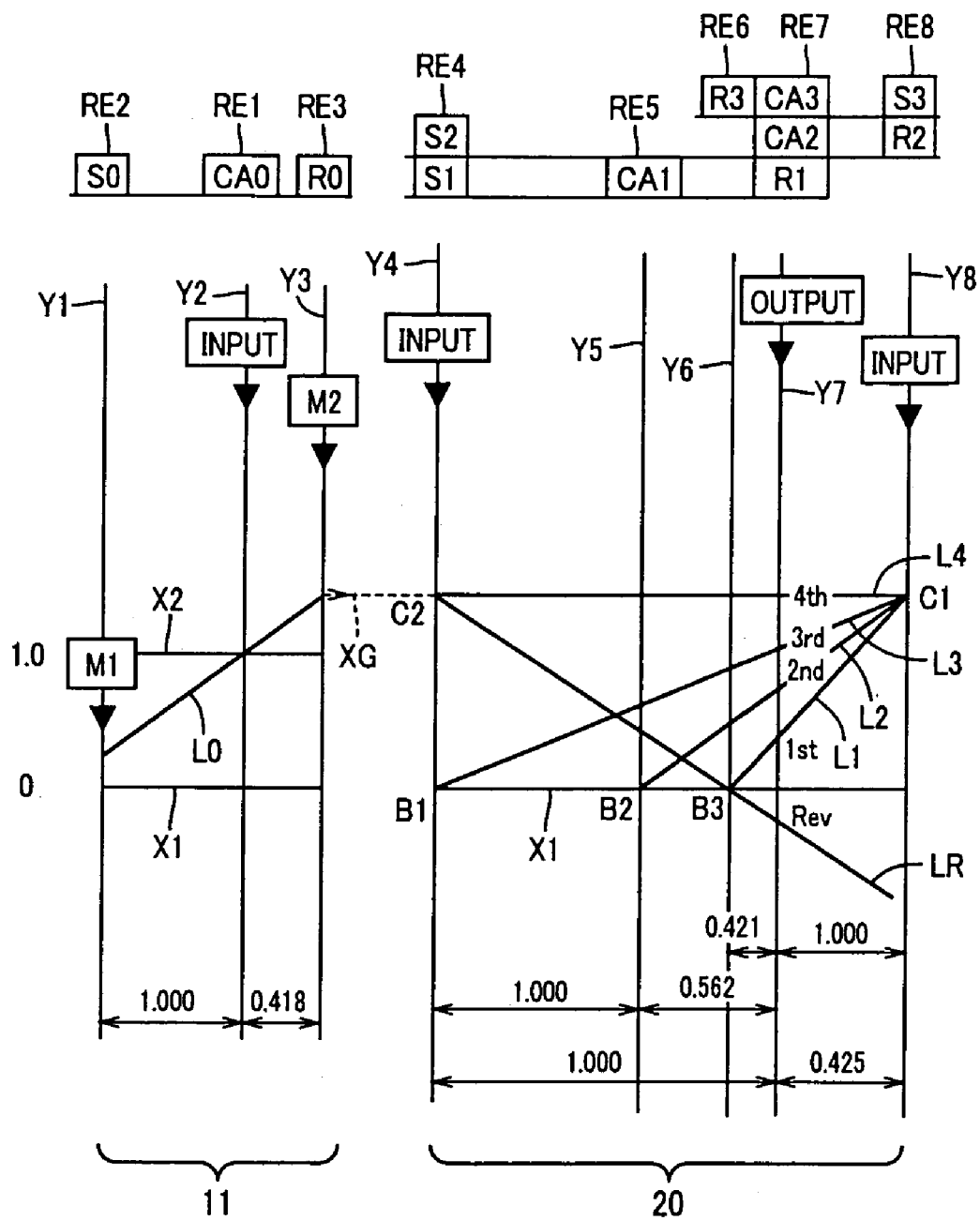
FIG. 3 is a collinear chart indicating mutually relative rotating speeds of rotary elements establishing various gear positions in the hybrid vehicle power transmitting device shown in FIG. 1.

FIG. 3 is a collinear chart for the transmission mechanism 10, including the differential portion 11 and the automatic transmission portion 20, wherein the relative motion relationships among the rotational speeds of the various rotary elements in different coupling states for each gear position can be plotted on straight lines. The collinear chart of FIG. 3 takes the form of a two-dimensional coordinate system having the abscissa axis plotted with the gear ratios ρ of the planetary gear sets 24, 26, 28, 30 and the ordinate axis plotted with the mutually relative rotating speeds of the rotary elements. A transverse line X1 indicates the rotational speed that is zeroed; a transverse line X2 the rotational speed of "1.0", that is, the rotating speed $N_E$ of the engine 8 connected to the input shaft 14; and a transverse line XG the rotational speed of the power transmitting member 18.

Starting from the left, three vertical lines Y1, Y2 and Y3, associated with the three elements of the power distributing mechanism 16 forming the differential portion 11, represent the mutually relative rotating speeds of the differential portion sun gear S0 corresponding to a second rotary element (second element) RE2, the differential portion carrier CA0 corresponding to a first rotary element (first element) RE1, and the differential portion ring gear R0 corresponding to a third rotary element (third element) RE3, respectively. A distance between the adjacent vertical lines is determined based on the gear ratio ρ0 of the differential portion planetary gear set 24.

Starting from the left, further, five vertical lines Y4, Y5, Y6, Y7 and Y8 for the automatic transmission portion 20 represent the mutually relative rotating speeds of: the first and second sun gears S1, S2, connected to each other, which corresponds to a fourth rotary element (fourth element) RE4; the first carrier CA1 corresponding to a fifth rotary element (fifth element) RE5; the third ring gear R3 corresponding to a sixth rotary element (sixth element) RE6; the first ring gear R1, second carriers CA2 and third carriers CA3, connected to each other, which correspond to a seventh rotary element (seventh element) RE7; and the second ring gear R2 and third sun gear S3 connected to each other and corresponding to an eighth rotary element (eighth element) RE8, respectively. Each distance between the adjacent vertical lines is determined based on the gear ratios ρ1, ρ2 and ρ3 of the first, second and third planetary gear sets 26, 28, 30.

In the relationship among the vertical lines on the collinear chart, if a space between the sun gear and carrier is set to a distance corresponding to a value of "1", then, a space between the carrier and ring gear lies at a distance corresponding to the gear ratio ρ of the planetary gear set. That is, for the differential portion 11, a space between the vertical lines Y1 and Y2 is set to a distance corresponding to a value of "1" and a space between the vertical lines Y2 and Y3 is set to a distance corresponding to the gear ratio ρ0. For the automatic transmission portion 20, further, the space between the sun gear and carrier is set to the distance corresponding to the value of "1" for each of the first, second and third planetary gear sets 26, 28, 30, for which the space between the carrier and ring gear is set to the distance corresponding to the gear ratio ρ.

Referring to the collinear chart of FIG. 3, the power distributing mechanism 16 (differential portion 11) of the transmission mechanism 10 is arranged such that the first rotary element RE1 (differential portion carrier CA0) of the differential portion planetary gear set 24 is connected to the input shaft 14, i.e., the engine 8, and the second rotary element RE2 is connected to the first electric motor M1. The third rotary element RE3 (differential portion ring gear R0) is connected to the power transmitting member 18 and the second electric motor M2. Thus, a rotary motion of the input shaft 14 is transmitted (input) to the automatic transmission portion 20 through the power transmitting member 18. A relationship between the rotational speeds of the differential portion sun gear S0 and the differential portion ring gear R0 is represented by an inclined straight line L0 which passes across a point of intersection between the lines Y2 and X2.

Now, description is made of a case in which, for example, the differential portion 11 is placed in a differential state with the first to third rotary elements RE1 to RE3 enabled to rotate relative to each other while the rotational speed of the differential portion ring gear R0, indicated at an intersecting point between the straight line L0 and the vertical line Y3, is bound with the vehicle speed V and remains at a nearly constant level. In this case, as the engine speed $N_E$ is controlled with the rotational speed of the differential portion carrier CA0, as represented by an intersecting point between the straight line L0 and the vertical line Y2, being raised or lowered, the rotational speed of the differential portion sun gear S0, i.e., the rotational speed of the first electric motor M1, indicated by an intersecting pint between the straight line L0 and the vertical line Y1, is raised or lowered.

On controlling the rotational speed of the first electric motor M1 so as to allow the differential portion 11 to have the speed ratio γ0 of "1" with the differential portion sun gear S0 rotating at the same speed as the engine speed $N_E$, the straight line L0 is aligned with the horizontal line X2. When this takes place, the differential portion ring gear R0, i.e., the power transmitting member 18, is caused to rotate at the same speed as the engine speed $N_E$. On the contrary, if the rotational speed of the first electric motor M1 is controlled so as to allow the differential portion 11 to have the speed ratio γ0 of a value less than "1", for instance, a value of approximately "0.7" with the rotational speed of the differential portion sun gear S0 being zeroed, the power transmitting member 18 is caused to rotate at an increased transmitting-member rotational speed $N_{18}$ higher than the engine speed $N_E$.

With the automatic transmission portion 20, the fourth rotary element RE4 is selectively connected to the power transmitting member 18 via the second clutch C2 and selectively connected to the casing 12 via the first brake B1 with the fifth rotary element RE5 being selectively connected to the casing 12 via the second brake B2. The sixth rotary element RE6 is selectively connected to the casing 12 via the third brake B3 with the seventh rotary element RE7 connected to the output shaft 22, and the eighth rotary element RE8 is selectively connected to the power transmitting member 18 via the first clutch C1.

Next, description is made of a case wherein with the automatic transmission portion 20, the differential portion 11 is placed in a state where rotation of the transmitting member 18 which is the output rotary member is input to the eighth rotary element RE8 with coupling of the first clutch C1 upon which the first clutch C1 and the third brake B3 are coupled as shown in FIG. 3. In this case, the rotational speed of the output shaft 22 for the 1st-speed gear position is represented by an intersecting point between the inclined line L1, passing across an intersecting point between the vertical line Y8, indicative of the rotational speed of the eighth rotary element RE8, and the horizontal line X2 and a point of intersection between the vertical line Y6, indicative of the rotational speed of the sixth rotary element RE6, and the horizontal line X1, and an intersecting point intersecting the vertical line Y7 indicative of the rotational speed of the seventh rotary element RE connected to the output shaft 22 as indicated in FIG. 3.

Similarly, the rotational speed of the output shaft 22 for the 2nd-speed gear position is represented by an intersecting point between an inclined straight line L2, determined when the first clutch C1 and second brake B2 are coupled, and the vertical line Y7 indicative of the rotational speed of the seventh rotary element RE7 connected to the output shaft 22. The rotational speed of the output shaft 22 for the 3rd-speed gear position is represented by an intersecting point between an inclined straight line L3, determined with the first clutch C1 and first brake B1 being coupled, and the vertical line Y7 indicative of the rotational speed of the seventh rotary element RE7 connected to the output shaft 22. The rotational speed of the output shaft 22 for the 4th-speed gear position is represented by an intersecting point between a horizontal straight line L4, determined with the first clutch C1 and second clutch C2 being coupled, and the vertical line Y7 indicative of the rotational speed of the seventh rotary element RE7 connected to the output shaft 22.

Figure 4:
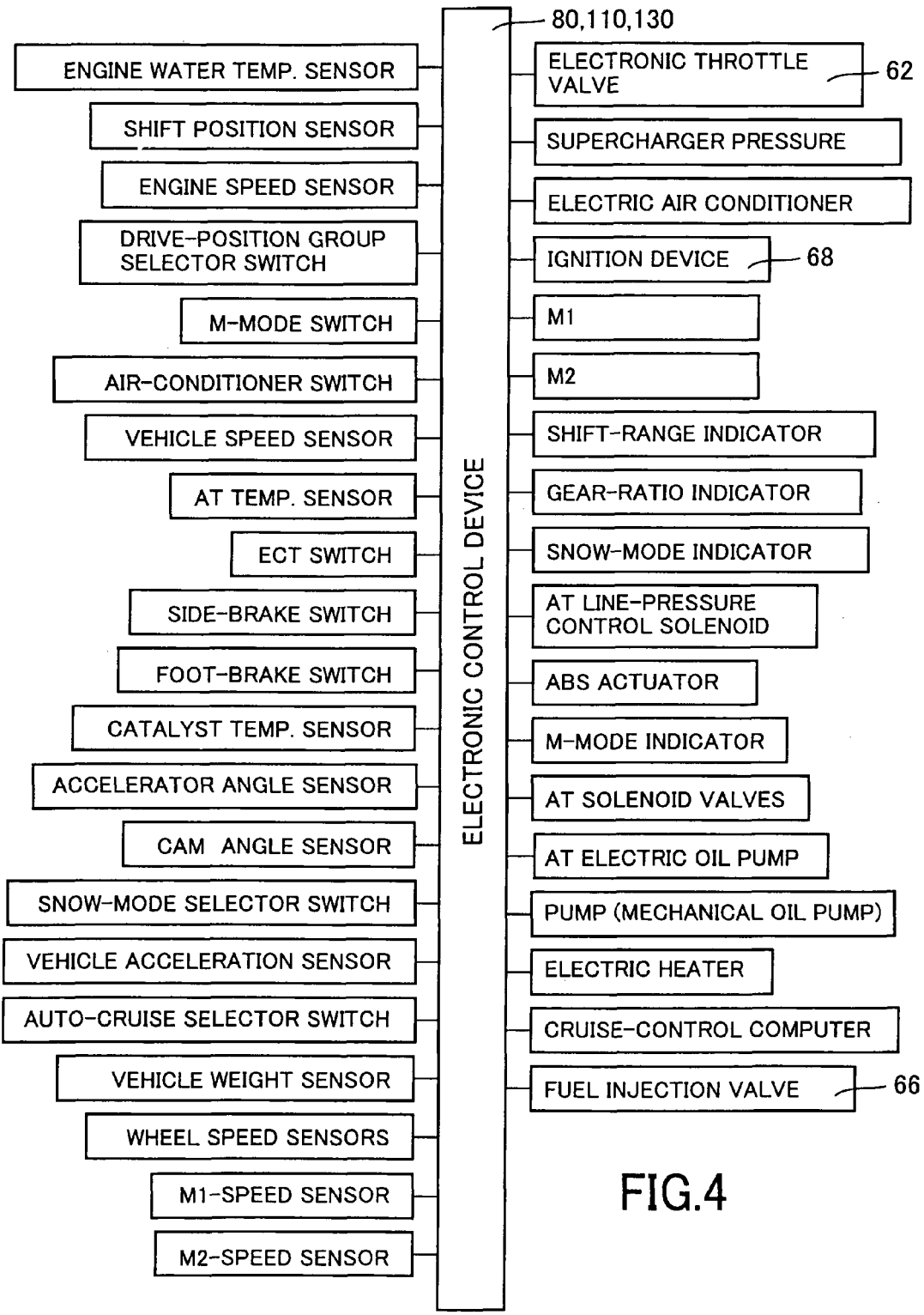
FIG. 4 is a view showing an electronic control unit with input and output signals associated therewith which is provided in the hybrid vehicle power transmitting device shown in FIG. 1.

FIG. 4 shows an electronic control unit 80 operative to control the transmission mechanism 10 of the present invention for generating various output signals in response to various input signals. The electronic control unit 80 includes a so-called microcomputer incorporating a CPU, a ROM, a RAM and an input/output interface, and is arranged to process the signals according to programs stored in the ROM while utilizing a temporary data storage function of the ROM. The electronic control unit 80 implements hybrid drive controls of the engine 8 and first and second electric motors M1 and M2, and drive controls such as shifting controls of the automatic transmission portion 20, and functions as the engine start-up device controlling start-up control of the engine 8.

The electronic control unit 80, connected to various sensors and switches as shown in FIG. 4, receives various signals such as: a signal indicative of an engine coolant temperature $TEMP_W$; a signal indicative of a shift position $P_{SH}$ selected with a shift lever 52 (shown in FIG. 5) and a signal indicative of the number of operations initiated on the "M" position; a signal indicative of the engine speed $N_E$ representing the rotational speed of the engine 8; a signal indicative of a gear train preset value; a signal commanding an M mode (manual shift running mode); a signal indicative of an operated state of an air conditioner; a signal indicative of the rotational speed (hereinafter referred to as "output shaft speed") $N_{OUT}$ of the output shaft 22; a signal indicative of a temperature $T_{OIL}$ of working oil of the automatic transmission portion 20, a signal indicative of a side brake under operation; a signal indicative of a foot brake under operation.

Figure 6:
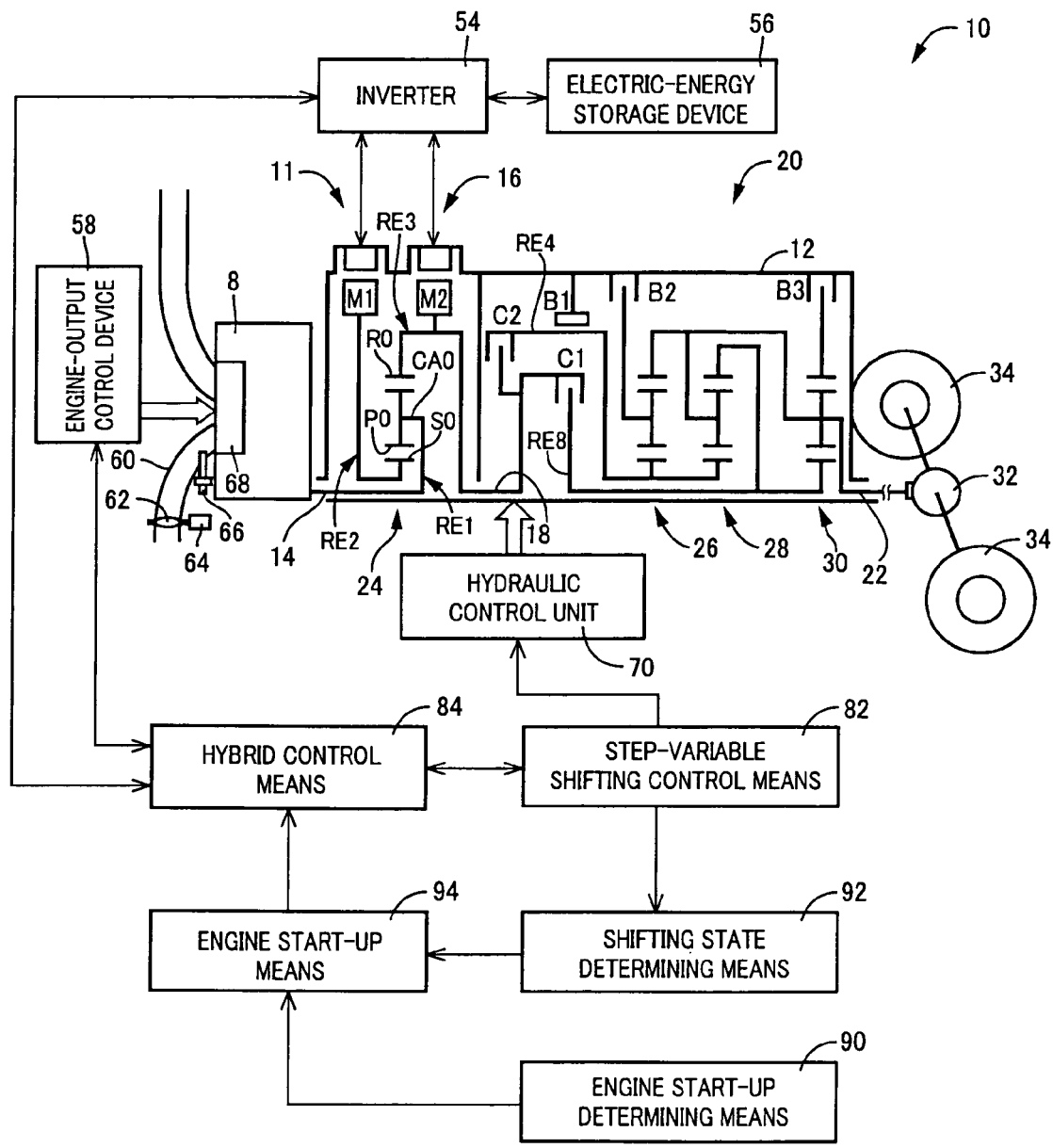
FIG. 6 is a functional block diagram illustrating major control functions of the electronic control unit of FIG. 4 in the first embodiment.

The electronic control unit 80 also receives a signal indicative of a temperature of a catalyst; a signal indicative of an accelerator opening Acc representing an operating stroke of an accelerator pedal when manipulated by a driver for his output demand value; a signal indicative of a cam angle; a signal indicative of a snow mode under setting; a signal indicative of a fore and aft acceleration value G of the vehicle; a signal indicative of an auto-cruising drive mode; a signal indicative of a weight vehicle weight) of the vehicle; a signal indicative of a wheel velocity of each drive wheel; a signal indicative of a rotational speed $N_{M1}$ of the first electric motor M1 (hereinafter referred to as "first-electric motor speed $N_{M1}$); a signal indicative of a rotational speed $N_{M2}$ of the second electric motor M2 (hereinafter referred to as "second-electric motor speed $N_{M2}$); and a signal indicative of a state of charge SOC stored in an electric-energy storage device 60 (see FIG. 6).

The electronic control unit 80 generates various signals including: a control signal applied to an engine output control device 58 (see FIG. 6) for controlling an engine output, i.e., a drive signal applied to a throttle actuator 64 for controlling a throttle valve opening $θ_{TH}$ of an electronic throttle valve 62 disposed in an intake manifold 60 of the engine 8; a fuel supply quantity signal applied to a fuel injecting device 66 for controlling an amount of fuel injected into the intake manifold 60 or cylinders of the engine 8; an ignition signal applied to an ignition device 68 to control the ignition timing of the engine 8; a supercharger pressure regulation signal for regulating a supercharger pressure of the engine 8; an electric air-conditioner drive signal for actuating an electric air conditioner; command signals for commanding the operations of the first and second electric motors M1 and M2; a shift-position (manipulated position) display signal for actuating a shift-range indicator; a gear-ratio indicating signal for displaying the gear ratio.

The electronic control unit 80 also generates snow-mode display signal for displaying the presence of a snow-mode; an ABS actuation signal for operating an ABS actuator to preclude slippages of the drive wheels during a braking phase; an M-mode display signal for displaying an M-mode being selected; valve command signals for actuating electromagnetic valves (linear solenoid valves), incorporated in the hydraulic control unit 70 (see FIG. 6) for controlling the hydraulic actuators of the hydraulically operated frictional coupling devices of the differential portion 11 and automatic transmission portion 20; a signal for regulating a regulator valve (pressure regulator valve), incorporated in the hydraulic control unit 70, to regulate a line pressure PL; a drive command signal for actuating an electric hydraulic pump acting as a hydraulic original-pressure source for the line pressure $P_L$ to be regulated; a signal for driving an electric heater; and a signal applied to a cruise-control computer.

Figure 5:
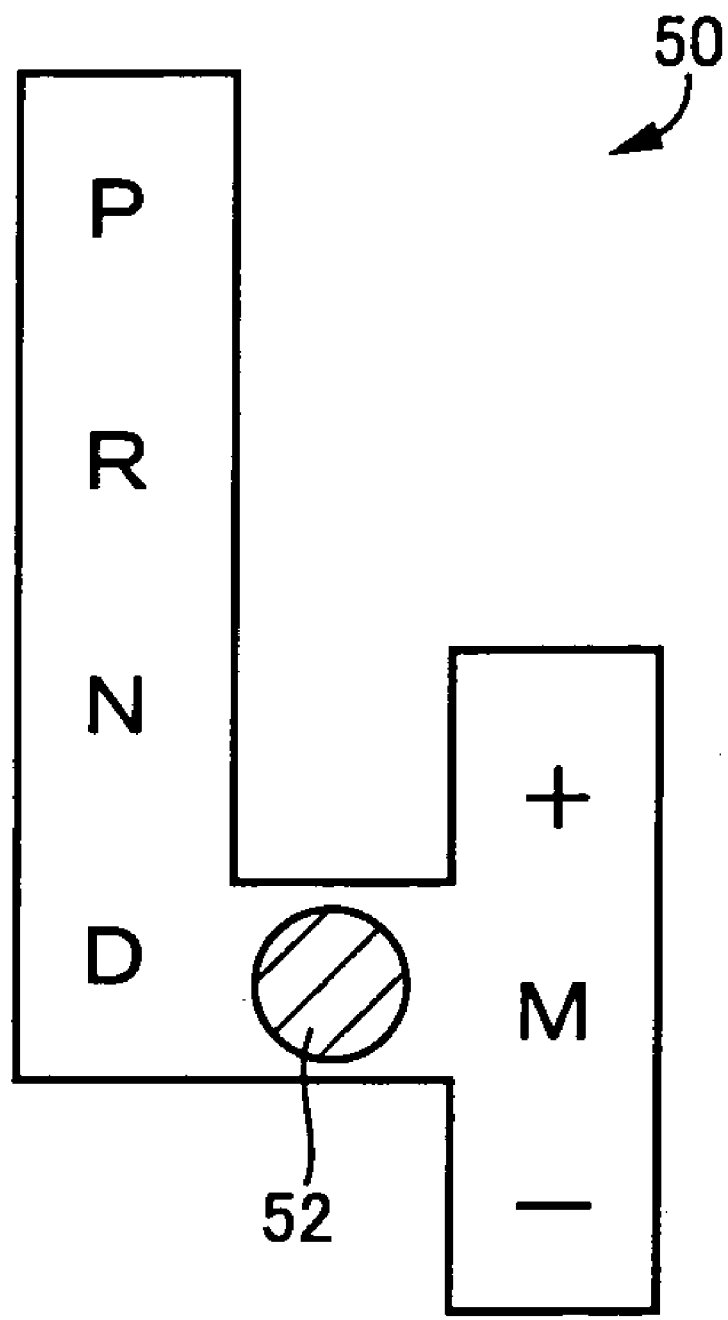
FIG. 5 is a view showing one example of a manually operated shifting device including a shift lever and operable to select one of a plurality of shift positions of multiple kinds.

FIG. 5 is a view showing one example of a manually operated shifting device 50 serving as a changeover device operative to shift multiple kinds of shift positions $P_{SH}$ on manual operation. The shifting device 50 is mounted in, for instance, an area lateral to a driver's seat and includes a shift lever 52 to be manipulated for selecting one of the plurality of shift positions $P_{SH}$.

The shift lever 52 has a parking position "P" (Parking) under which an inside of the transmission mechanism 10, i.e., the power transmitting path inside the automatic transmission portion 20 is shut off in a neutral condition, i.e., a neutral state with the output shaft 22 of the automatic transmission portion 20 remained in a locked state; a reverse drive position "R" (Reverse) for a reverse drive mode; a neutral position "N" (Neutral) for the power transmitting path of the transmission mechanism 10 to be shut off in the neutral state; an automatic forward-drive running position "D" (Drive); and a manual-shift forward-drive position "M" (Manual). In the automatic forward-drive running position "D", an automatic shift mode is established for executing an automatic shift control within a varying range of a shiftable total speed ratio γT of the transmission mechanism 10 resulting from various gear positions whose automatic shift control is performed in a continuously variable speed ratio width of the differential portion 11 and a range of the 1st-speed to the 4th-speed gear positions of the automatic transmission portion 20. The manual-shift forward-drive position "M" is manually shifted to establish a manual-shift forward-drive mode (manual mode) for setting a so-called shift range to limit a shifting gear position on a high speed range during the operation of the automatic transmission portion 20 under the automatic shift control.

As the shift lever 52 is shifted to the various shift positions $P_{SH}$, the hydraulic control circuit 70 is electrically switched, thereby obtaining the reverse-drive "R" gear position, the neutral position "N" and the various gear shift positions or the like in the forward-drive gear position "D".

Among the various shift positions $P_{SH}$ represented in the "P" to "M" positions, the "P" and "N" positions represent non-running positions selected when no vehicle is caused to run. That is, the "P" and "N" positions represent non-drive positions selected when the first and second clutches C1, C2 select to cause the power transmitting path to be switched to a power cut-off state like a situation where as indicated in, for instance, the coupling operation indicating table shown in FIG. 2, both the first and second clutches C1, C2 are uncoupled to interrupt the power transmitting path inside the automatic transmission portion 20 so as to disenable the driving of the vehicle.

The "R", "D" and "M" positions represent running positions selected when the vehicle is caused to run. That is, these positions represent drive positions selected when the first and/or second clutches C1, C2 select to cause the power transmitting path to be switched to a power transmitting state like a situation where as indicated in, for instance, the coupling operation indicating table shown in FIG. 2, at least one of the first and second clutches C1, C2 is coupled to establish the power transmitting path inside the automatic transmission portion 20 so as to enable the vehicle to be driven.

More particularly, as the shift lever 52 is manually shifted from the "P" position or the "N" position to the "R" position, the second clutch C2 is coupled to cause the power transmitting path of the automatic transmission portion 20 to be switched from the power cut-off state to the power transmitting state. With the shift lever 52 manually shifted from the "N" position to the "D" position, at least the first clutch C1 is coupled to switch the power transmitting path of the automatic transmission portion 20 from the power cut-off state to the power transmitting state. Further, as the shift lever 52 is manually shifted from the "R" position to the "P" or "N" position, the second clutch C2 is uncoupled to switch the power transmitting path of the automatic transmission portion 20 from the power transmitting state to the power cut-off state. With the shift lever 52 manually shifted from the "D" position to the "N" position, the first clutch C1 or second clutch C2 is uncoupled to switch the power transmitting path of the automatic transmission portion 20 from the power transmitting state to the power cut-off state.

FIG. 6 is a functional block diagram illustrating major control functions to be executed by the electronic control unit 80. Step-variable shifting control means 82 determines a shift demand to the automatic transmission portion 20 based on the output shaft rotational-speed relevant value and a driver's request to cause the automatic transmission portion to execute the automatic shift control so as to obtain a demanded shift position in response to the shift demand. For instance, the step-variable shifting control means 82 determines whether to execute the shifting of the automatic transmission portion 20, i.e., the gear position to be shifted for causing the automatic transmission portion to execute the automatic shift control, based on the vehicle condition, represented by an actual vehicle speed V and the required output torque $T_{OUT}$ of the automatic transmission 20 by referring to the relationships (shifting lines and shifting map) involving up-shift lines (in solid lines) and down-shift lines (in single dot lines) that are preliminarily stored as parameters of the vehicle speed V and the output torque $T_{OUT}$ of the automatic transmission 20 represented in FIG. 7.

When this takes place, the step-variable shifting control means 82 outputs commands (a shift output command and a hydraulic pressure command) to the hydraulic control circuit 70 for coupling and/or uncoupling the hydraulically operated frictional coupling devices, involved in the shifting of the automatic transmission portion 20 so as to establish the gear position in accordance with the coupling table shown in FIG. 2. That is, the step-variable shifting control means 82 outputs a command to the hydraulic control circuit 70 for uncoupling the on-uncoupling coupling device, involved in the shifting, while coupling the on-coupling coupling device to cause the clutch-to-clutch shifting to be executed. Upon receipt of such commands, the hydraulic control circuit 70 causes the linear solenoid valves SL of the automatic transmission portion 20 to be actuated. This allows the hydraulically operated actuators of the hydraulically operated frictional coupling devices, involved in the relevant shifting, to be actuated. Thus, for instance, the on-uncoupling side coupling device is uncoupled and the on-coupling side coupling device is coupled, causing the automatic transmission portion 20 to execute the shifting.

Hybrid control means 84 operates the engine 8 in an optimum operating range at a high efficiency while distributing the drive forces of the engine 8 and the second electric motor M2 at optimum rates and optimally varying a reacting force of the first electric motor M1 during the operation thereof to generate electric power, thereby controllably operating the differential portion 11 under an electrically controlled continuously variable transmission to control a speed ratio γ0.

At a vehicle speed V during the running of the vehicle in one occasion, for instance, a target (demanded) output for the vehicle is calculated based on the accelerator opening Acc and the vehicle speed V both representing output demanded variables of the driver, after which a demanded total target output is calculated based on the target output of the vehicle and a battery charge demanded value. Subsequently, a target engine output is calculated in consideration of a loss in power transmission, loads of auxiliary units, assist torque of the second electric motor M2 or the like so as to obtain the total target output. Then, the hybrid control means 84 controls the engine 8, while controlling a rate of electric power being generated by the first electric motor M1, so as to obtain the engine speed $N_E$ and engine torque $T_E$ such that the target engine output is obtained.

The hybrid control means 84 executes such controls in consideration of, for instance, the gear position of the automatic transmission portion 20 with a view to increasing a dynamic performance and improving fuel consumption. During such hybrid controls, the differential portion 11 is caused to operate as the electrically controlled continuously variable transmission such that the engine speed $N_E$ and the vehicle speed V, determined for the engine 8 to operate in the operating range at a high efficiency, match the vehicle speed and the rotational speed of the power transmitting member 18 determined with the gear position in the automatic transmission portion 20.

That is, the hybrid control means 84 determines a target value of the total speed ratio γT of the transmission mechanism 10 such that the engine 8 is caused to operate along an optimal fuel efficiency curve (a fuel efficiency map and the relationships) of the engine 8 which is preliminarily and experimentally obtained and prestored. This achieves a compromise between driveability and fuel consumption during the running of the vehicle under a continuously variable shifting mode on a two-dimensional coordinate established with the engine speed $N_E$ and output torque (engine torque) $T_E$ of the engine 8. For instance, the target value of the total speed ratio γT of the transmission mechanism 10 is determined so as to obtain engine torque $T_E$ and the engine speed $N_E$ for generating the engine output demanded for satisfying target outputs (a total target output and demanded drive torque). Then, the speed ratio 70 of the differential portion 11 is controlled in consideration of the gear position in the automatic transmission portion 20 so as to obtain the relevant target value, thereby controlling the total speed ratio γT within a continuously variable shifting range.

When this takes place, the hybrid control means 84 allows electric energy, generated by the first electric motor M1, to be supplied through an inverter 54 to a battery device 56 and the second electric motor M2. Thus, a major part of drive power of the engine 8 is mechanically transferred to the power transmitting member 18. However, a part of drive power of the engine 8 is consumed with the first electric motor M1 for the generation of electric power and converted into electric energy. Resulting electric energy is supplied through the inverter 54 into the second electric motor M2, which is consequently driven. Therefore, the part of drive power is transferred through the second electric motor M2 to the power transmitting member 18. Equipment, involved in the operations starting from the step of generating electric power to the step of causing the second electric motor M2 to consume resultant electric energy, establishes an electric path in which the part of the drive power of the engine 8 is converted into electric energy and resultant electric energy is converted into mechanical energy.

The hybrid control means 84 allows the differential portion 11 to perform an electrically controlled CVT function for controlling, for instance, a first-electric-motor rotational speed $N_{M1}$ and/or a second-electric-motor rotational speed $N_{M2}$ to maintain the engine speed $N_E$ at a nearly constant level or to control the rotational speed at an arbitrary level regardless of the vehicle remaining under a halted condition or a running condition. In other words, the hybrid control means 84 controls the first-electric-motor rotational speed $N_{M1}$ and/or a second-electric-motor rotational speed $N_{M2}$ at an arbitrary level while maintaining the engine speed $N_E$ at the nearly constant level or the arbitrary rotational speed.

As will be apparent from the collinear chart shown in FIG. 3, for instance, when raising the engine speed $N_E$ during the running of the vehicle, the hybrid control means 84 raises the first-electric-motor rotational speed $N_{M1}$ while maintaining a second-electric-motor rotational speed $N_{M2}$ at a nearly fixed level that is bound with the vehicle speed V (represented by the drive wheels 34). In addition, when maintaining the engine speed $N_E$ at the nearly fixed level during the shifting of the automatic transmission portion 20, the hybrid control means 84 varies the first-electric-motor rotational speed $N_{M1}$ in a direction opposite to that in which the second-electric-motor rotational speed $N_{M2}$ varies with the shifting of the automatic transmission portion 20 while maintaining the engine speed $N_E$ at the nearly fixed level.

The hybrid control means 84 causes the throttle actuator 64 to controllably open or close the electronic throttle valve 62 for performing a throttle control. In addition, the hybrid control means 84 functionally includes engine output control means that outputs commands to an engine output control device 58 singly or in combination. This causes a fuel injection device 66 to control a fuel injection quantity and a fuel injection timing for fuel injection control while causing an ignition device 68 to control an ignition timing of an ignition device 68 such as an igniter or the like for an ignition timing control. Upon receipt of such commands, the engine output control device 58 executes an output control of the engine 8 so as to provide a demanded engine output.

For instance, the hybrid control means 84 basically drives the throttle actuator 60 in response to the accelerator opening Acc by referring to the prestored relationship (not shown). The throttle control is executed such that the greater the accelerator opening Acc, the larger will be the throttle valve opening $θ_{TH}$. Upon receipt of the commands from the hybrid control means 84, further, the engine output control device 58 allows the throttle actuator 64 to controllably open or close the electronic throttle valve 62 for throttle control while controlling the ignition timing of the ignition device 68 such as the igniter or the like for ignition timing control, thereby executing an engine torque control.

Further, the hybrid control means 84 is operative to cause the differential portion 11 to perform the electrically controlled CVT function (differential action) to achieve the motor drive mode using the second electric motor M2 as the drive force source regardless of the engine 8 remaining under the halted condition or an idling state.

For instance, the hybrid control means 84 achieves the motor drive mode in the relatively lower torque region $T_{OUT}$ i.e. low engine torque region $T_E$, or relatively lower vehicle speed region i.e. lower load region. In order to suppress a drag of the engine 8 being halted for improving fuel consumption during such a motor-drive running mode, the hybrid control means 84 controls the first-electric-motor rotational speed $N_{M1}$ in a negative rotational speed to render, for instance, the first electric motor operative under an unloaded condition, thereby achieving an idling state. In this way, the engine speed $N_E$ is zeroed or nearly zeroed depending on needs due to the electrically controlled CVT function (differential action) of the differential portion 11.

Even if the engine-drive running region which uses the engine 8 as the driving power source is present, the hybrid control means 84 allows the first electric motor M1 and/or the battery device 56 to supply electric energy to the second electric motor M2 using the electrical path mentioned above. This drives the second electric motor M2 to apply torque to the drive wheels 34, providing a so-called torque-assist for assisting drive power of the engine 8. Thus, the engine drive i.e. running of the present embodiment includes the engine drive and the electric motor drive.

The hybrid control means 84 renders the first electric motor M1 operative under the unloaded condition to freely rotate in the idling state. This causes the differential portion 11 to interrupt a torque transfer; i.e., the differential portion 11 is rendered inoperative with no output being provided under the same state as that in which the power transmitting path is disconnected in the differential portion 11. That is, the hybrid control means 84 places the first electric motor M1 in the unloaded condition, making it possible to place the differential portion 11 in a neutral condition (neutral state) in which the power transmitting path is electrically disconnected.

During a coast running (under a coast running state) of a vehicle with an accelerator pedal being released or during a braking mode of the vehicle with a foot brake being activated, further, the hybrid control means 84 has a function to serve as regeneration control means. In this regeneration control, the second electric motor M2 is rendered operative to act as an electric power generator and driven with kinetic energy of a vehicle, i.e. a reverse drive force transferred from the drive wheels 34 to the engine 8 to generate electric energy with a view to achieving fuel saving. Resulting electric energy, i.e. a second-motor-generated electric current is supplied via an inverter 54 to a battery 56 that is consequently charged. Such regeneration control is performed such that the regeneration is achieved at a power rate determined based on a state of charge SOC of the battery 56 and a braking force distribution rate of a braking force of a hydraulic brake actuated for obtaining the braking force depending on a depressing stroke of the brake pedal.

Figure 7:
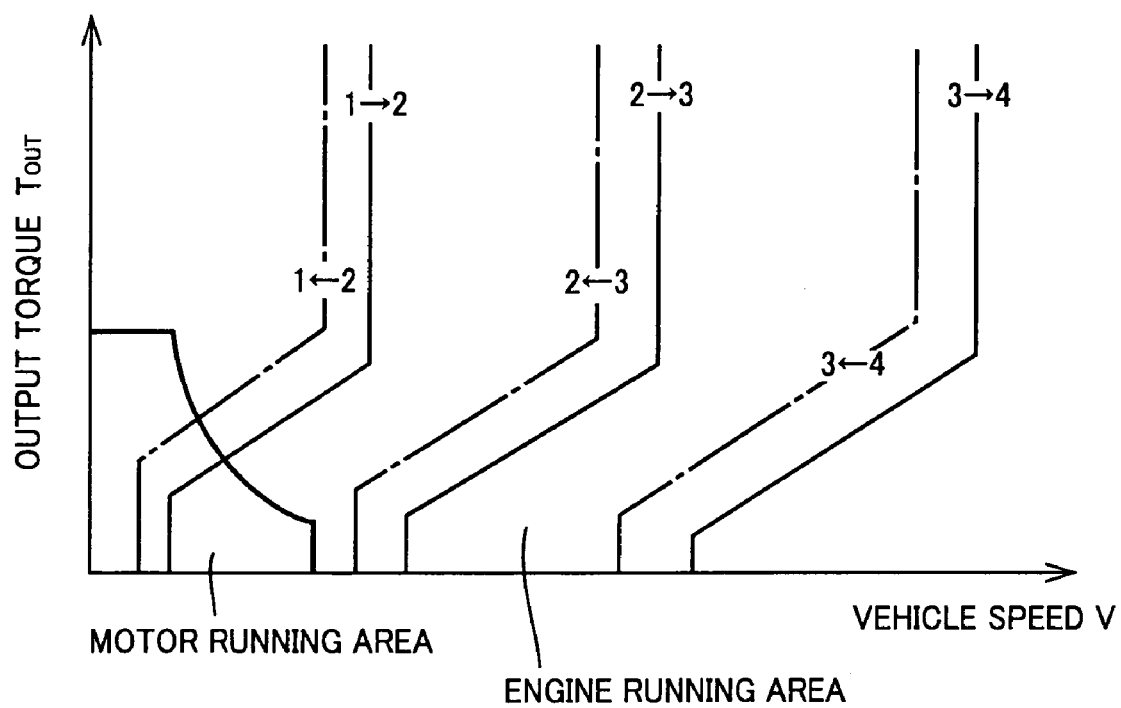
FIG. 7 is a view representing one example of a preliminarily stored shifting diagram, plotted on a two-dimensional coordinate in terms of parameters including a vehicle speed and output torque, based on which the operation is executed whether to a shifting is executed in an automatic shifting portion; one example of preliminarily stored diagram, based on which a shifting state of the shifting mechanism is switched; and one example of a preliminarily stored drive-force source switching diagram having a boundary line between an engine drive region and a motor drive region based on which an engine drive mode and a motor drive mode is switched.

During the shifting of the automatic shifting portion 20, upon depression of, for instance, the accelerator pedal, demanded output torque $T_{OUT}$ of the automatic shifting portion 20 may increase to cause a vehicle state to vary from a motor drive region to an engine drive region as shown in FIG. 7. Under such a situation, both operations are concurrently executed to perform a control for starting up the engine 8 and a shifting control of the automatic shifting portion 20. Hereunder, such a control operation for start-up of the engine 8 will be described below in detail.

Turning back to FIG. 6, engine start-up determining means 90 determines whether an electronic control device 80 has made an engine start-up determination representing a determination to start-up the engine 8 during a motor drive mode. For instance, if the accelerator pedal is deeply depressed, demanded output torque $T_{OUT}$ corresponding to an accelerator-opening Acc of the automatic shifting portion 20 is caused to increase as shown in FIG. 7. In this moment, if the vehicle state varies from the motor drive region to the engine drive region, then the engine start-up determination is made.

Shifting state determining means 92 determines whether the automatic shifting portion 20 executes the shifting. More particularly, if a down-shift is effectuated with the shifting performed so as to increase a speed ratio γ of the automatic shifting portion 20, then, a determination is made that the automatic shifting portion 20 executes a down-shifting. In contrast, if an up-shift is effectuated with the shifting performed so as to decrease the speed ratio γ of the automatic shifting portion 20, then, another determination is made that the automatic shifting portion 20 executes an up-shifting.

If none of the down-shifting and the up-shifting is present in the automatic shifting portion 20, i.e. when the automatic shifting portion 20 remains under a non-shifting mode with no execution of the shifting, then, a determination is made that the automatic shifting portion. 20 remains under the non-shifting mode. The operation as to whether the automatic shifting portion 20 belongs to the down-shifting or the up-shifting can be determined by referring to switching patterns of electromagnetic valves for controlling a clutch and a brake of the automatic shifting portion 20 and an engagement operation table shown in FIG. 2.

During the running of the vehicle under the motor drive mode, if the engine start-up determining means 90 makes a determination affirming that the engine start-up determination is made, then, engine start-up means 94 executes a control to start-up the engine 8. In this case, a start-up method of the engine 8, suited for the automatic shifting portion 20 executing the up-shifting or the down-shifting, is altered in mode different from that of a start-up method of the engine 8 with the automatic shifting portion 20 remaining under the non-shifting mode, after which the engine 8 is started up. In addition, the engine start-up means 94 executes the start-up method in mode different from each other depending on the up-shifting and the down-shifting executed in the automatic shifting portion 20.

Now, the start-up method of the engine 8 will be described below in detail. Under a circumstance where the engine start-up determining means 90 makes the determination affirming that the engine start-up determination is made, if the shifting state determining means 92 determines that the automatic shifting portion 20 remains under the non-shifting mode, then, no interruption occurs in a power transmitting path between the second electric motor M2 and the drive wheels 34. In this moment, if a vehicle speed V remains constant, then, a first-motor rotation speed $N_{M1}$ is caused to vary while permitting a second-motor rotation speed $N_{M2}$, bound with the vehicle speed V (a velocity of the drive wheel 34), to be kept constant. More particularly, the first-motor rotation speed $N_{M1}$ is caused to increase in the same rotational direction as that of the second-motor rotation speed $N_{M2}$. This causes an engine rotation speed $N_E$ for start-up of the engine to increase beyond an engine start-up rotation speed NE1, available to achieve the start-up of the engine, in the same rotational direction as those of the first and second electric motors M1 and M2.

When this takes place, output torque $T_{M1}$ (hereinafter referred to as "first-motor torque $T_{M1}$") of the first electric motor M1 causes the first-motor rotation speed $N_{M1}$ to increase. In this moment, the engine 8 has rotational resistance that acts on and lower the second-motor rotation speed $N_{M2}$ representing an input rotation speed of the automatic shifting portion 20. Thus, in order to sustain the second-motor rotation speed $N_{M2}$, output torque $T_{M2}$ (hereinafter referred to as "second-motor torque $T_{M2}$") of the second electric motor M2 is increased to a higher level than that in which no engine start-up is initiated. In addition, since no power transmitting path is interrupted, the reverse drive force, transferred from the drive wheels 34, is also utilized for increasing the engine rotation speed $N_E$. Accordingly, this results in a situation under which combined torques, resulting from the reverse drive force transferred from the drive wheels 34 and second-motor torque $T_{M2}$, counteract rotational resistance of the engine 8 acting on a third rotary element RE3 in a direction to lower second-motor torque $T_{M2}$.

Basically, further, in order to counteract rotational resistance of the engine 8, second-motor torque $T_{M2}$ for start-up of the engine is increased to be greater than that when no engine start is initiated. However, it may suffice not to increase second-motor torque $T_{M2}$ when almost no adverse affect occurs on the running of the vehicle even in the absence of an increase in second-motor torque $T_{M2}$. Such a phase appears when the reverse drive force, transferred from the drive wheels 34 to the differential portion 11, is extremely larger than rotational resistance of the engine 8. That is, no second electric motor M2 may be used for start-up of the engine but the first electric motor M1 may be used to increase the engine rotation speed $N_E$ for start-up of the engine.

Further, when the engine start-up determining means 90 makes the determination affirming that the engine start-up determination is made, if the shifting state determining means 92 determines that the automatic shifting portion 20 remains under the down-shifting mode, then the engine start-up means 94 executes the operation to increase the engine rotation speed $N_E$ for start-up of the engine 8 using both the first and second electric motors M1 and M2.

More particularly, the engine start-up means 94 controls second-motor torque $T_{M2}$, representing the input rotation speed of the automatic shifting portion 20, so as to vary, i.e. to increase, while controlling the first-motor torque $T_{M1}$ so as to vary the first-motor rotation speed $N_{M1}$. This allows the down-shifting to be established in the automatic shifting portion 20. That is, the first-motor rotation speed $N_{M1}$ is caused to increase in the same rotational direction as that of the second electric motor M2. This causes the engine rotation speed $N_E$ for start-up of the engine 8 to increase in the same rotational direction as those of the first and second electric motors M1 and M2 to a value beyond the engine start-up rotation speed NE1 available for start-up of the engine.

Furthermore, the engine start-up determining means 90 makes the determination affirming that the engine start-up determination is made. In this case, the shifting state determining means 92 determines that the automatic shifting portion 20 remains under the down-shifting mode. Even under such a state, the engine start-up means 94 executes the operation to increase the engine rotation speed $N_E$ for start-up of the engine 8 using both the first and second electric motors M1 and M2. More particularly, the engine start-up means 94 controls second-motor torque $T_{M2}$, representing the input rotation speed of the automatic shifting portion 20, so as to vary, i.e. to decrease, while controlling the first-motor torque $T_{M1}$ so as to vary the first-motor rotation speed $N_{M1}$. This allows the up-shifting to be established in the automatic shifting portion 20. That is, the first-motor rotation speed $N_{M1}$ is caused to increase in the same rotational direction as that of the second electric motor M2. This causes the engine rotation speed $N_E$ for start-up of the engine 8 to increase in the same rotational direction as those of the first and second electric motors M1 and M2 to a value beyond the engine start-up rotation speed NE1 available for start-up of the engine.

Therefore, during both of the up-shifting and down-shifting of the automatic shifting portion 20, the shifting operations are executed with an accompanying consequence in which the engagement and the disengagement of the clutch or the brake are concurrently progressed with an interrupted state in the power transmitting path between the second electric motor M2 and the drive wheels 34. In this case, no reverse drive, delivered from the drive wheels 34, can be utilized. Thus, during the shifting (in the down-shifting or up-shifting mode) of the automatic shifting portion 20, the engine start-up control means 94 makes alteration or determination to increase second-motor torque $T_{M2}$ to a value greater than that appearing when the automatic shifting portion 20 remains under the non-shifting mode.

Also, it can be said that second-motor torque $T_{M2}$, required for the engine rotation speed $N_E$ to be increased for start-up of the engine during the shifting, is reactive torque that sustains the second-motor rotation speed $N_{M2}$ for establishing the shifting in the automatic shifting portion 20 and counteracts rotational resistance of the engine 8. In addition, during the operation of the automatic shifting portion 20 in either the shifting mode or the non-shifting mode, first-motor torque $T_{M1}$ and second-motor torque $T_{M2}$ are determined based on a result on an experimental test in consideration of a fluctuation in rotational resistance of the engine 8.

Furthermore, during the operation of the automatic shifting portion 20 under either the shifting-mode or the non-shifting mode, the engine rotation speed $N_E$ is caused to increase for start-up of the engine. When this takes place, if the engine rotation speed $N_E$ exceeds the engine start-up rotation speed NE1, then the engine start-up control means 94 starts up the engine 8, i.e. initiates an engine ignition. Moreover, during the shifting of the automatic shifting portion 20, the engine ignition may be initiated at timing either before or after a time when the shifting is completed. However, it is provable that the engine ignition timing and the shifting completion timing overlap each other, i.e. a time difference between these timings falls in a given time interval. In such a case, there is a fear of the occurrence in which an engine start-up shock and a shifting shock occur in overlapping relationship, with an accompanying shock arising to remarkably impair the feeling of a vehicle occupant. Therefore, the engine ignition timing may be determined so as to avoid such an issue.

Figure 8:
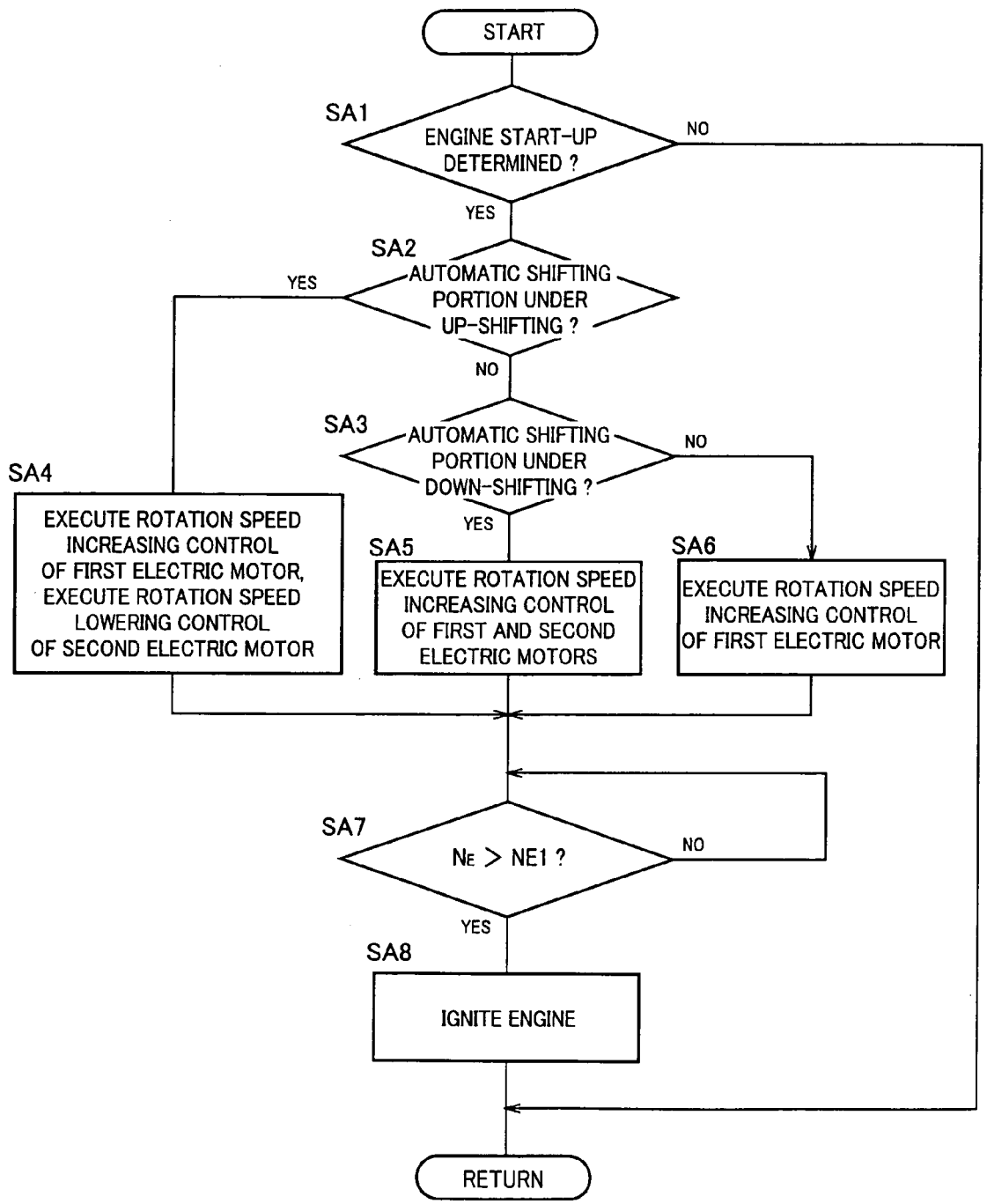
FIG. 8 is a flow chart illustrating a basic sequence of control operations to be executed with the electronic control unit shown in FIG. 4, i.e. a basic sequence of control operations to be executed for initiating an engine start-up during a motor drive mode.

FIG. 8 is a flow chart illustrating a basic sequence of major control operations to be executed by the electronic control device 80, i.e., a basic sequence of control operations to be executed for starting up the engine 8 during the motor drive mode. Such a basic sequence is repeatedly executed for an extremely short cycle time ranging from, for instance, approximately several milliseconds to several tens milliseconds.

First at step (hereinafter the term "step" is omitted) SA1 corresponding to the engine start-up determining means 90, it is questioned if the engine start-up determination is made in the motor drive mode. For instance, if the accelerator pedal is deeply depressed, demanded output torque $T_{OUT}$, corresponding to the accelerator-opening Acc, of the automatic shifting portion 20 increases as shown in FIG. 7. In this case, a vehicle state varies from the motor drive region to the engine drive region, causing the engine start-up determination to be made. If the answer to the question is YES, i.e. if the engine start-up determination is made, then the engine 8 needs to start-up, and logic flow goes to SA2. If, on the other hand, the answer is NO, then the control routine, indicated in the flow chart shown in FIG. 8, is terminated.

At SA2, a query is made as to whether the up-shifting or the down-shifting is executed in the automatic shifting portion 20. If the answer is YES, i.e. if the up-shifting is executed in the automatic shifting portion 20, then the flow proceeds to SA4. If, on the other hand, the answer is No, then the flow proceeds to SA3.

At SA3, a query is made as to whether the down-shifting is executed in the automatic shifting portion 20. If the answer is YES, i.e. if the down-shifting is executed in the automatic shifting portion 20, then logic flow goes to SA5. In contrast, if the answer is NO, i.e. if the automatic shifting portion 20 remains under the non-shifting mode, then the flow goes to SA6. Also, SA2 and SA3 collectively correspond to the shifting state determining means 92.

At SA4, the second-motor rotation speed $N_{M2}$, representing the input rotation speed of the automatic shifting portion 20, is lowered so as to establish the up-shifting in the automatic shifting portion 20. In addition, the first-motor rotation speed $N_{M1}$, used for start-up of the engine, is caused to increase in the same rotational direction as that of the second electric motor M2. Thus, the engine rotation speed $N_E$ for start-up of the engine increases in the same rotational direction as those of the first and second electric motors M1 and M2 to a value greater than the engine start-up rotation speed NE1 available for start-up of the engine.

At SA5, the second-motor rotation speed $N_{M2}$ is raised so as to establish the up-shifting in the automatic shifting portion 20. In addition, the first-motor rotation speed $N_{M1}$ is raised in the same rotational direction as that of the second electric motor M2. Thus, the engine rotation speed $N_E$ for start-up of the engine increases in the same rotational direction as those of the first and second electric motors M1 and M2 to a value greater than the engine start-up rotation speed NE1 available for start-up of the engine. Moreover, due to the up-shifting or the down-shifting of the automatic shifting portion 20, the engagement and the disengagement of the clutch and the brake are concurrently progressed, thereby interrupting the power transmitting path between the second electric motor M2 and the drive wheels 34. Thus, no reverse drive force is transferred from the drive wheels 34 to the engine 8. In this case, second-motor torque $T_{M2}$, appearing during the shifting of the automatic shifting portion 20, is caused to increase to a value greater than that appearing when the automatic shifting portion 20 remains under the non-shifting mode.

At SA6, the automatic shifting portion 20 remains under the non-shifting mode with no interruption in the power transmitting path between the second electric motor M2 and the drive wheels 34. If the vehicle speed V remains constant, the second-motor rotation speed $N_{M2}$, bound with the vehicle speed V (velocity of the drive wheel 34), is kept constant and the first-motor rotation speed $N_{M1}$ is raised in the same rotational direction as that of the second electric motor M2. Thus, the engine rotation speed $N_E$ for start-up of the engine increases in the same rotational direction as those of the first and second electric motors M1 and M2 to a value greater than the engine start-up rotation speed NE1 available for start-up of the engine.

In this moment, while first-motor torque $T_{M1}$ causes an increase in the first-motor rotation speed $N_{M1}$, rotational resistance of the engine 8 acts in a direction to lower the second-motor rotation speed $N_{M2}$ representing the input rotation speed of the automatic shifting portion 20. This causes the second-motor rotation speed $N_{M2}$ to be sustained and second-motor torque $T_{M2}$ becomes greater than that appearing when no engine start is initiated. Also, even under a circumstance where either the shifting or the non-shifting is executed in the automatic shifting portion 20, first-motor torque $T_{M1}$ and second-motor torque $T_{M2}$ are determined based on results of experimental tests in consideration of the fluctuation in rotational resistance of the engine 8.

If any of SA4 to SA6 is executed, then flow routine proceeds to SA7 wherein a query is made as to whether the engine rotation speed $N_E$ exceeds the engine start-up rotation speed NE1. If the answer is YES, i.e. when the engine rotation speed $N_E$ exceeds the engine start-up rotation speed NE1, the flow proceeds to SA8. If, on the other hand, the answer is NO, then SA7 is repeated executed again. That is, the increase in the engine rotation speed $N_E$, accompanied by the execution of any of SA4 to SA6, continues until the engine rotation speed $N_E$ exceeds the engine start-up rotation speed NE1, after which if the engine rotation speed $N_E$ becomes greater than the engine start-up rotation speed NE1, then the flow goes to SA8.

At SA8, the engine ignition is initiated and the engine 8 is started up. Also, SA4 to SA8 collectively correspond to the engine start-up means 94.

Figure 9:
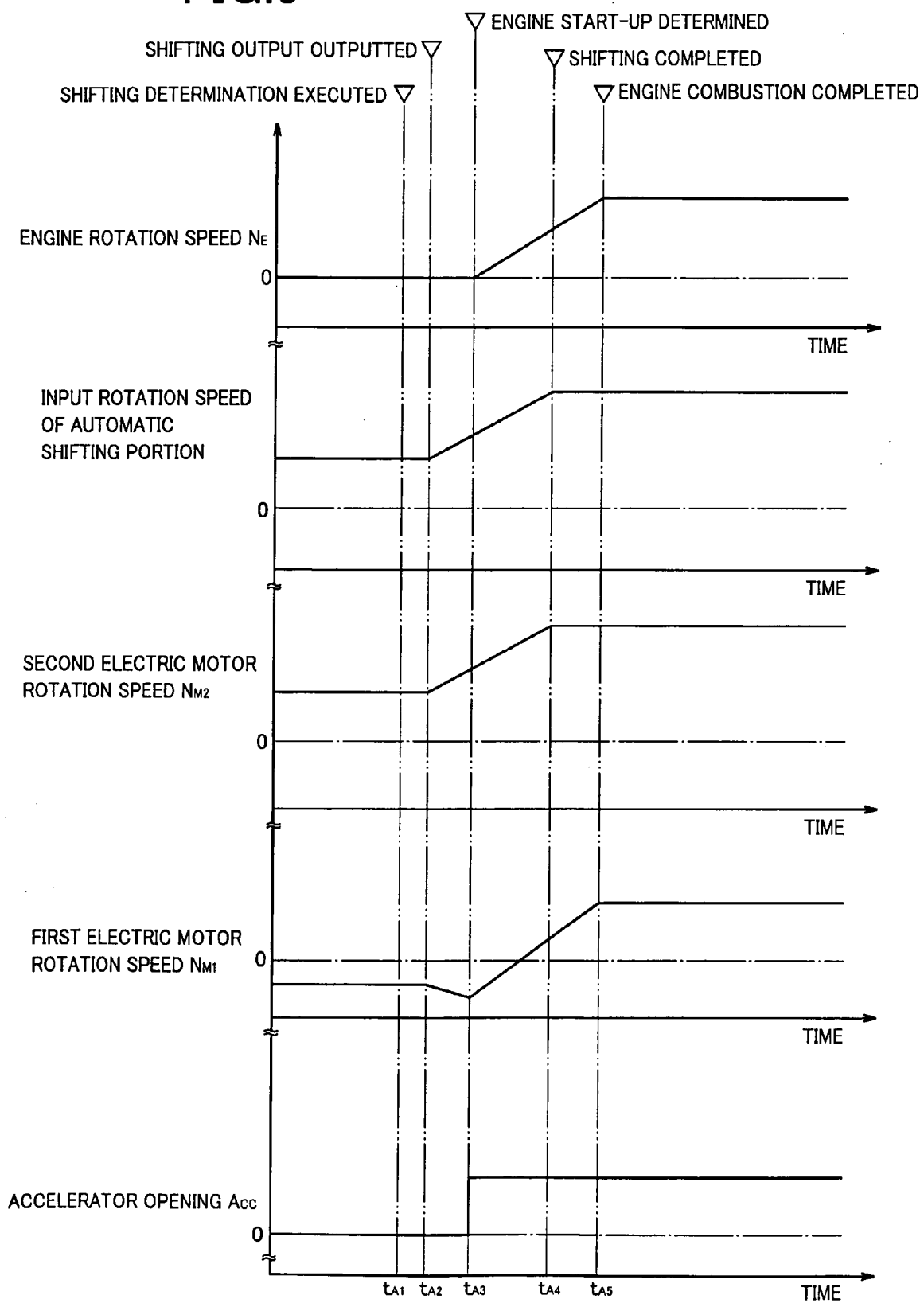
FIG. 9 is a flow chart, illustrating the control operations shown in FIG. 8, which shows an exemplary case under which an accelerator pedal is depressed during the motor drive mode to allow an engine start-up determination to be made during a down-shift of an automatic shifting portion.

FIG. 9 is a timing chart, illustrating the control routine shown in the flow chart of FIG. 8, which represents an exemplary timing chart wherein the accelerator pedal is depressed with accompanying engine start-up determination made during the down-shifting of the automatic shifting portion 20. In FIG. 9, there is shown the timing chart indicating the engine rotation speed $N_E$ beginning at the top, the input rotation speed of the automatic shifting portion 20, the second-motor rotation speed $N_{M2}$, the first-motor rotation speed $N_{M1}$ and the accelerator-opening Acc. In the illustrated embodiment, the input rotation speed of the automatic shifting portion 20 is identical to the second-motor rotation speed $N_{M2}$.

Time $t_{A1}$, shown in FIG. 9, represents timing at which the electronic control device 80 executes the operation based on the shifting map shown in FIG. 7 to make a shift determination on whether to initiate the shifting in the automatic shifting portion 20.

Time $t_{A2}$ represents timing at which a shifting output, commanding the automatic shifting portion 20 to execute the shifting, is output to the hydraulic control circuit 70, i.e. timing at which the shifting output is delivered commanding the automatic shifting portion 20 to execute the down-shifting. Upon receipt of this shifting output, the automatic shifting portion 20 begins to execute the shifting at time $t_{A2}$. In this case, the second-motor rotation speed $N_{M2}$, i.e. the input rotation speed of the automatic shifting portion 20 is raised so as to establish the down-shifting in the automatic shifting portion 20. In addition, at time $t_{A2}$, no engine 8 rotates due to its own rotational resistance. Thus, the first electric motor M1, remaining under a freely rotatable state, has the first-motor rotation speed $N_{M1}$ that increases at time $t_{A2}$ in a direction opposite to the rotational direction of the second electric motor M2.

Time $t_{A3}$ represents timing at which the accelerator pedal is depressed, i.e. the accelerator-opening Acc increases. With the presence of the increase in the accelerator-opening Acc, the vehicle state changes from the motor drive region to the engine drive region as shown in FIG. 7. In this case, the electronic control device 80 makes the engine start-up determination. Then, the answer is YES at SA1 in FIG. 8, and at SA3 shown in FIG. 8 is YES indicating that the down-shifting is executed in the automatic shifting portion 20. Thus, the first-motor rotation speed $N_{M1}$ is caused to increase in the same rotational direction as that of the second electric motor M2 at time $t_{A3}$, with an accompanying increase in the engine rotation speed $N_E$ for start-up of the engine. Although not shown in FIG. 9, with the increase in the engine rotation speed $N_E$ at time $t_{A3}$, rotational resistance of the engine 8 acts in a direction to lower the second-motor rotation speed $N_{M2}$. This causes second-motor torque $T_{M2}$ to increase at time $t_{A3}$.

Time $t_{A4}$ represents timing at which the shifting is completed in the automatic shifting portion 20. Accordingly, at time $t_{A4}$ or later, the automatic shifting portion 20 enters the non-shifting mode, under which the second-motor rotation speed $N_{M2}$, i.e. the input rotation speed of the automatic shifting portion 20 is kept constant at time $t_{A4}$ in conformity to the vehicle speed V. However, no engine has started up yet at time $t_{A4}$, thereby causing the engine rotation speed $N_E$ to continuously increase due to the increase in the first-motor rotation speed $N_{M1}$.

Time $t_{A5}$ represents timing at which a complete combustion takes place in the engine 8, i.e. the engine rotation speed $N_E$ reaches the engine start-up rotation speed NE1, thereby indicating that the answer at SA7 in FIG. 8 is YES and the engine ignition is initiated at SA8 in FIG. 8. Further, in order to avoid the overlapping between the shifting shock, resulting from the completion in shifting of the automatic shifting portion 20, and the engine start-up shock, an engine start time may be determined such that a time difference between time $t_{A4}$ and time $t_{A5}$ exceeds a given time interval.

Figure 10:
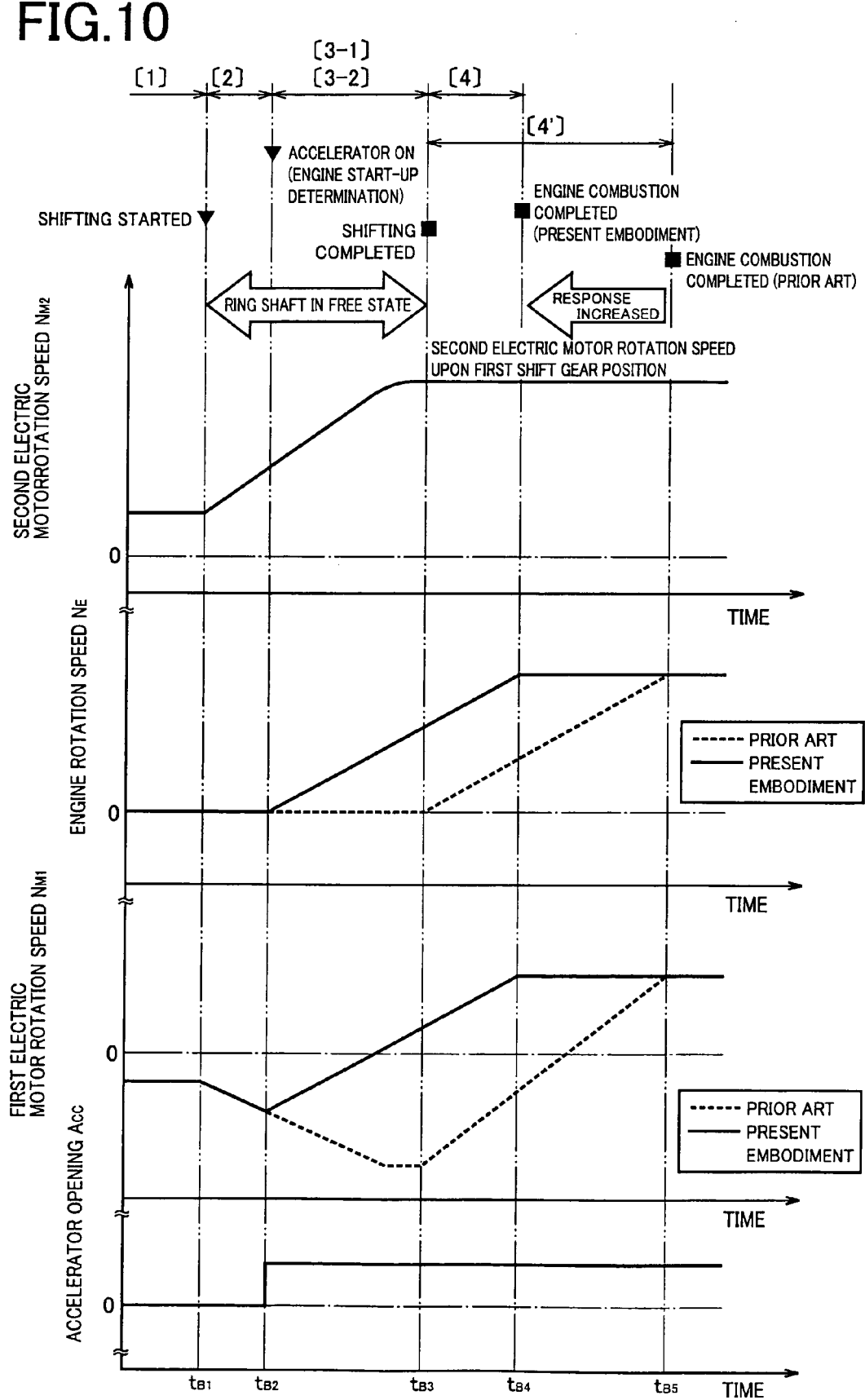
FIG. 10 is a flow chart for making a comparison between the control operations shown in the flow chart of FIG. 8, and control operations executed in the related art. In the related art, the control operations are executed so as to interrupt an engine start-up control during the shifting of the automatic shifting portion while commencing an operation to increase an engine rotation speed after the completion of such a shifting.

FIG. 10 is a timing chart for making comparison between the control routine, related to the first embodiment indicated in the flow chart of FIG. 8, and the control routine of the related art. With the control routine of the related art, an engine start-up control is cancelled during the shifting of the automatic shifting portion 20 and, after the termination of shifting, a control operation is commenced to increase the engine rotation speed $N_E$ for start-up of the engine. This represents an exemplary case wherein during a coast running of a vehicle, an accelerator pedal is depressed with the vehicle running under a motor drive mode and the engine start-up determination is made during the down-shifting of the automatic shifting portion 20 from a 2nd- to 1st-speed gear position. Times $t_{B1}$ to $t_{B4}$, shown in FIG. 10, correspond to times $t_{A2}$ to $t_{A5}$ shown in FIG. 9. Hereunder, description will be given with a focus on differing points.

At time $t_{B2}$, the accelerator-opening Acc increases with an accompanying change of the vehicle state from the motor drive region to the engine drive region shown in FIG. 7. When this takes place, the electronic control device 80 makes the engine start-up determination. In the first illustrated embodiment, like the timing chart shown in FIG. 9, the first-motor rotation speed $N_{M1}$ is caused to increase in the same rotational direction as that of the second electric motor M2 at time $t_{B2}$ in FIG. 10, with an accompanying increase in the engine rotation speed $N_E$ for start-up of the engine. Meanwhile, in the control routine of the related art, no engine rotation speed $N_E$ for start-up of the engine is caused to increase during the shifting of the automatic shifting portion 20. Thus, as shown by a broken line in FIG. 10, the first electric motor M1 rotates at the first-motor rotation speed $N_{M1}$ that continuously increases in a direction opposite to the rotational direction of the second electric motor M2 such that the engine rotation speed $N_E$ is sustained at a zeroed level.

Time $t_{B3}$ represents timing at which the shifting is completed in the automatic shifting portion 20. Accordingly, as indicated by a broken line in FIG. 10, the control routine of the related art are executed to cause the first-motor rotation speed $N_{M1}$ to increase in the same rotational direction as that of the second electric motor M2 at time $t_{B3}$ or later. This resulted in an increase in the engine rotation speed $N_E$ for start-up of the engine. In addition, during a time period between time $t_{B1}$, at which the automatic shifting portion 20 begins executing the shifting, and time $t_{B3}$, at which the shifting is completed in the automatic shifting portion 20, the relevant shifting operation interrupts the power transmitting path of the automatic shifting portion 20. In other words, this allows a ring shaft of the differential portion 11, connected to the power transmitting member 18 serving as the input shaft of the automatic shifting portion 20, to take a state unrestricted with the drive wheels 34, i.e. in a freewheeling state.

Time $t_{B4}$ represents timing at which a complete combustion occurs in the engine 8 in the first illustrated embodiment. In the control routine of the related art, no complete combustion takes place yet in the engine 8 at time $t_{B4}$ and the engine 8 achieves the complete combustion of at time $t_{B5}$. According to the timing chart shown in FIG. 10, therefore, it can be said that in comparison to the control routine of the related art, the present embodiment requires less time for the engine to reach the complete combustion from time $t_{B5}$ to time $t_{B4}$ with an accompanying increased response.

FIG. 11 is a series of collinear charts illustrating relative rotation speeds of the first electric motor M1, the engine 8 and the second electric motor M2 in respective periods [1] to [4] and [4'] in FIG. 10 and respective periods [1] to [4] and [4'] in FIG. 11 plotted on a time axis (horizontal axis) of FIG. 10. The periods [1] to [4] and [4'] in FIG. 10 and the periods [1] to [4] and [4'] in FIG. 11 correspond to each other, respectively. The periods [3-1] in FIG. 11 show the control operations of the related art and the period [3-2] in FIG. 11 shows the control operations of the present embodiment. The collinear charts [1], [2], [4] and [4'] in FIG. 11 represent the control operations implemented in the present embodiment and the control operations executed in the related art.

The collinear chart shown in FIG. 11 shows a status appearing up to time $t_{B1}$ in FIG. 10. This status represents that the automatic shifting portion 20 (indicated at "AT" in FIG. 11) remains under the non-shifting mode and the power transmitting path of the automatic shifting portion 20 remains in a coupling state, i.e. a clutch-engaging state. In this case, the vehicle is in the coast running state with the Accelerator-opening Acc remaining at the zeroed level and, hence, the second electric motor M2 is rendered operative to act as an electric power generator. As indicated by an arrow $T_{R1}$ in FIG. 11, the second electric motor M2 generates torque in a direction to lower the second-motor rotation speed $N_{M2}$. In addition, a straight line $L_{S1}$ intersects three vertical axes at respective intersecting points that represent the rotation speeds of the first electric motor M1, the engine 8 and the second electric motor M2. Intersecting points between a broken line $L_S$ and the three vertical axes represent the rotation speeds of the first electric motor M1, the engine 8 and the second electric motor M2 after the engine has achieved the complete combustion with the shifting executed in the automatic shifting portion 20 at the 1st-speed gear position.

The collinear chart, shown in FIG. 11, represents a status involved in a period from time $t_{B1}$ to time $t_{B2}$ in FIG. 10. This represents the shifting of the automatic shifting portion 20 with accompanying interruption of the power transmitting path of the automatic shifting portion 20, i.e. the automatic shifting portion 20 remains in a freewheeling state with the clutch remaining disengaged. In order to establish the down-shifting in the automatic shifting portion 20 from the 2nd-speed to the 1st-speed gear position, the second electric motor M2 generates torque as indicated by an arrow $T_{R2}$ in FIG. 11. This results in an increase in the second-motor rotation speed $N_{M2}$ representing the input rotation speed of the automatic shifting portion 20. In addition, intersecting points between a straight line $L_{S2}$ and the three vertical axes represent the rotation speeds of the first electric motor M1, the engine 8 and the second electric motor M2, respectively The collinear chart, shown FIG. 11[3-1], shows a status in a period from time $t_{B2}$ to time $t_{B3}$, shown in FIG. 10, which belongs to the control routine of the related art. Under such a status, the shifting is executed in the automatic shifting portion 20 with the power transmitting path of the automatic shifting portion 20 continuously remaining in the freewheeling state. In this case, for establishing the down-shifting in the automatic shifting portion 20, the second motor M2 continuously outputs second-motor torque $T_{M2}$ so as to increase the second-motor rotation speed $N_{M2}$. Also, an arrow $T_{R3}$, shown in FIG. 11[3-1], shows second-motor torque $T_{M2}$. In addition, intersecting points between a straight line $L_{S3-1}$ and the three vertical axes represent the rotation speeds of the first electric motor M1, the engine 8 and the second electric motor M2, respectively.

The collinear chart, shown FIG. 11[3-2], shows a status in a period from time $t_{B2}$ to time $t_{B3}$, shown in FIG. 10, which belongs to the control routine implemented in the present embodiment. Under such a status, the shifting is executed in the automatic shifting portion 20 with the power transmitting path of the automatic shifting portion 20 continuously remaining in the freewheeling state. Thus, the down-shifting is executed in the automatic shifting portion 20. This causes the second motor M2 to output second-motor torque $T_{M2}$ as indicated by an arrow $T_{R4}$ so as to increase the second-motor rotation speed $N_{M2}$. At time $t_{B2}$, the engine start-up determination is made as set forth above. Therefore, the engine rotation speed $N_E$ is caused to increase due to first-motor torque $T_{M1}$ and second-motor torque $T_{M2}$ that are output as indicated by arrows $T_{R5}$ and $T_{R4}$, respectively.

Here, second-motor torque $T_{M2}$ continuously sustains the increase in the second-motor rotation speed $N_{M2}$ to counteract rotational resistance of the engine 8 acting in a direction as indicated by an arrow $T_{R6}$. Thus, second-motor torque $T_{M2}$, acting in a direction as indicated by the arrow $T_{R4}$, represents torque that combines torque for increasing the second-motor rotation speed $N_{M2}$ to establish the down-shift and reactive torque acting in opposition to rotational resistance of the engine 8. Thus, second-motor torque $T_{M2}$, indicated by the arrow $T_{R4}$, is greater than second-motor torque $T_{M2}$ indicated by the arrow $T_{R3}$. In addition, intersecting points between a straight line $L_{S3-2}$ and the three vertical axes represent the rotation speeds of the first electric motor M1, the engine 8 and the second electric motor M2, respectively.

The collinear chart of FIG. 11[4'] shows a status in a period from time $t_{B3}$ to time $t_{B4}$ or from time $t_{B3}$ to time $t_{B5}$ shown in FIG. 10. Under such a status, the shifting is completed in the automatic shifting portion 20 and the power transmitting path of the automatic shifting portion 20 remains in a coupling state. Thus, no increase occurs in the second-motor rotation speed $N_{M2}$ that is bound with the vehicle speed V (wheel velocity of each drive wheel 34). However, for the purpose of increasing the first-motor rotation speed $N_{M1}$ to increase the engine rotation speed $N_E$ for start-up of the engine, second-motor torque $T_{M2}$, indicated by an arrow $T_{R7}$ counteracting rotational resistance of the engine 8, and first-motor torque $T_{M1}$, indicated by an arrow $T_{R8}$, are output. Consequently, second-motor torque $T_{M2}$, indicated by the arrow $T_{R7}$, represents torque equal to a sum of a drive force used for driving the vehicle and reactive torque opposing rotational resistance of the engine 8. In addition, intersecting points between a straight line $L_{S4}$ and the three vertical axes represent the rotation speeds of the first electric motor M1, the engine 8 and the second electric motor M2, respectively.

The electronic control device 80 of the first embodiment has various advantageous effects (1) to (6) as listed below.

(1) The engine start-up means 94 alters the start-up method of the engine 8 in a phase relevant to the shifting of the automatic shifting portion 20 relative to the start-up method of the engine 8 in a phase relevant to the non-shifting of the automatic shifting portion 20, thereby starting up the engine 8. This makes it possible to avoid the operation to start-up the engine 8 from adversely affecting the shifting operation of the automatic shifting portion 20. Further, an engine start-up operation can be commenced during the shifting of the automatic shifting portion 20. This makes it possible to allow acceleration demanded by a driver to be achieved with further improved response than that achieved when the engine start-up operation is executed in parallel to the execution of the shifting like a case wherein the engine start-up operation is commenced after the completion of the shifting in the automatic shifting portion 20.

(2) The engine rotation speed $N_E$ for start-up of the engine 8 may be increased upon using the first electric motor M1 without using the second electric motor M2 during the non-shifting of the automatic shifting portion 20. Such a control for increasing the engine rotation speed $N_E$ can be further easily performed than the control executed upon using both the first and second electric motors M1 and M2. This enables the electronic control device 80 to have a reduced control load during the non-shifting of the automatic shifting portion 20.

(3) During the shifting of the automatic shifting portion 20, the engine rotation speed $N_E$ for start-up of the engine 8 can be increased upon using both the first and second electric motors M1 and M2. This makes it possible to increase the engine rotation speed $N_E$ for start-up of the engine 8 during the shifting of the automatic shifting portion 20. This allows the engine 8 to be started up on an earlier stage. This allows the acceleration demanded by the driver to be achieved with improved response.

(4) When increasing the engine rotation speed $N_E$ for start-up of the engine 8, second-motor torque $T_{M2}$ for the shifting of the automatic shifting portion 20 is altered relative to second-motor torque $T_{M2}$ for the non-shifting of the automatic shifting portion 20. This makes it possible to prevent the engine start-up operation from adversely affecting the shifting of the automatic shifting portion 20. Further, the engine start-up operation can be commenced during the shifting of the automatic shifting portion 20. This makes it possible to allow acceleration demanded by a driver to be achieved with further improved response than that achieved when the engine start-up operation is executed in parallel to the execution of the shifting like a case wherein the engine start-up operation is commenced after the completion of the shifting in the automatic shifting portion 20.

(5) Second-motor torque $T_{M2}$ relevant to the shifting of the automatic shifting portion 20 is altered to be greater than that relevant to the non-shifting of the automatic shifting portion 20. This makes it possible to increase the engine rotation speed $N_E$ for start-up of the engine 8 regardless of the shifting of the automatic shifting portion 20. This allows the acceleration demanded by the driver to be achieved with improved response.

(6) The differential portion 11 is rendered operative to act as the continuously variable transmission (infinitely variable shifting mechanism) upon controlling an operating state of the first electric motor M1. This allows the differential portion 11 to output drive torque in a smoothly varying manner.

Second Embodiment

A second embodiment, described below, is identical in part to the first embodiment in respect of FIG. 1 and FIGS. 5 and 7 and FIG. 6 (corresponding to FIG. 12 for the second embodiment). Therefore, for the sake of simplified description, descriptions on and illustrations of these drawings will be omitted herein but will be referred to those descriptions and illustrations when needed. A control device of the second embodiment is shown in FIG. 4 in the form of "control device 110". Hereunder, the second embodiment will be described below with a focus on points different from the first embodiment in structure and operation thereof.

With the second embodiment, the first and second electric motors M1 and M2 incorporate therein rotation speed sensors such as resolvers, respectively, each for enabling the detection of a rotation speed and a rotational direction.

Considering response and comfort demanded by a driver, when a running state of a vehicle changes from a motor drive region to an engine drive region, there is a need for the engine to be immediately started up even under the execution of the shifting in the automatic shifting portion 20. Hereunder, a basic sequence of control operations to achieve such an effect will be described below.

Figure 12:
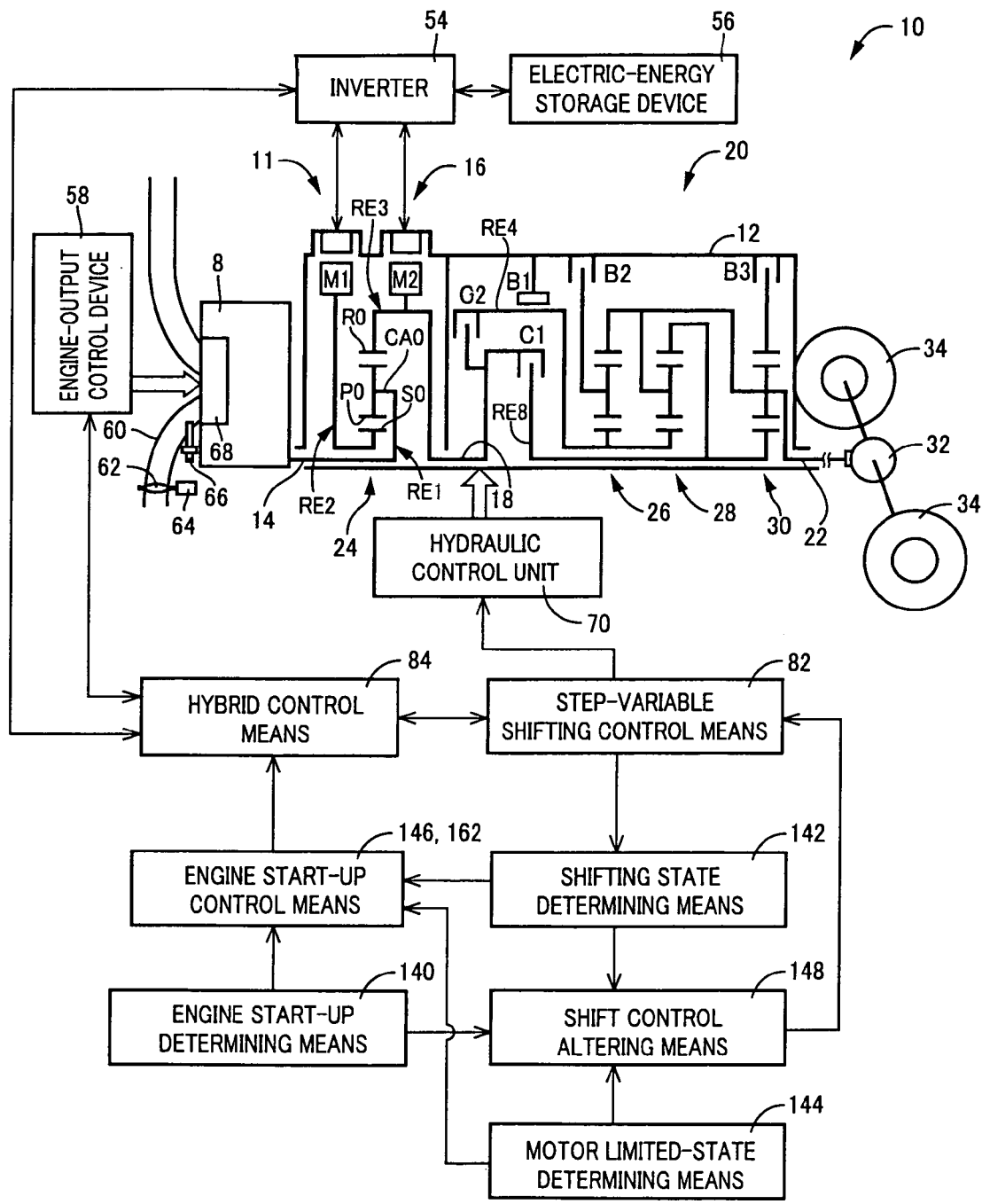
FIG. 12 is a functional block diagram illustrating major control functions to be executed with the electronic control unit of FIG. 4 in a second embodiment.

In FIG. 12, engine start-up determining means 140 determines whether the electronic control device 110 makes an engine start-up determination representing a determination to start-up the engine 8. For instance, if an accelerator pedal is deeply depressed during the motor drive mode, demand output torque $T_{OUT}$ of the automatic shifting portion 20 increases in accordance with the accelerator-opening Acc. If the vehicle state changes from the motor drive mode to the engine drive mode, the engine start-up determination is made.

Shifting state determining means 142 determines whether the shifting is being executed in the automatic shifting portion 20. More particularly, there is a likelihood that the automatic shifting portion 20 executes the shifting operation in line with an inertia phase under which the second-motor rotational speed $N_{M2}$, representing the input rotation speed of the automatic transmission portion 20, varies depending on a progress of the shifting. For such likelihood, the shifting state determining means 142 determines that the shifting is executed in the automatic shifting portion 20. A query is made as to whether the shifting operation of the automatic transmission portion 20 falls in the inertia phase. This query is made based on, for instance, a control signal, applied to an electromagnetic valve for controlling a clutch or a brake of the automatic transmission portion 20, and the second-motor rotational speed $N_{M2}$.

Motor limited-state determining means 144 determines whether the first electric motor M1 or the second electric motor M2, both being driven in response to an output of the battery 56, remains in a state unavailable to provide a predetermined drive force, i.e. whether the drive force of the first electric motor M1 or the second electric motor M2 is limited. In other words, the motor limited-state determining means 144 determines whether the output, delivered from the battery 56 such as a rechargeable battery, is limited to fall in a status unavailable to cause the battery 56 to provide the predetermined output. For instance, under a situation where the battery 56 has a shortage in state of charge SOC or under a case where the first electric motor M1 or the second electric motor M2 reaches high temperatures beyond a given value, the output of the battery 56 is limited.

If the engine start-up determining means 140 determines that the engine start-up determination is made, then the engine start-up control means 146 performs a control depending on the drive force of the first electric motor M1 for driving the engine 8, the drive force of the second electric motor M2, acting as a reactive force against the drive force of the first electric motor M1, and a shifting state of the automatic shifting portion 20. This allows the control to be executed based on, for instance, a variable range of the speed ratio γ achieved in the automatic shifting portion 20 so as to drivably rotate the first electric motor M1 in the same rotational direction as that of the second electric motor M2. This causes the engine rotation speed $N_E$ to increase to a value beyond the engine start-up rotation speed NE1, i.e. 1000 rpm for instance, thereby initiating the engine ignition.

Here, the drive force of the first electric motor M1 and the drive force of the second electric motor M2 have one-on-one proportional relations with output torque $T_{M1}$ (hereinafter referred to as "first-motor torque $T_{M1}$") of the first electric motor M1 and output torque $T_{M2}$ (hereinafter referred to as "second-motor torque $T_{M2}$") of the second electric motor M2, respectively. The proportional relations vary such that the greater the first-motor torque $T_{M1}$ and the second-motor torque $T_{M2}$, the greater will be the drive force of the first electric motor M1 and the drive force of the second electric motor M2, respectively.

A detailed description will be given on the controls for the drive forces of the first and second electric motors M1 and M2. When the engine start-up determining means 140 determines that the engine start-up determination is made, the shifting state determining means 142 makes a determination affirming that the shifting is executed in the automatic shifting portion 20, and the motor limited-state determining means 144 makes a determination denying that the drive forces of the first and second electric motors M1 and M2 are limited. In this moment, the engine start-up control means 146 controls first-motor torque $T_{M1}$ and second-motor torque $T_{M2}$ in a manner as described below.

That is, in order to increase the engine rotation speed $N_E$ to the value beyond the engine start-up rotation speed NE1, first-motor torque $T_{M1}$ and second-motor torque $T_{M2}$ are controlled such that a time (hereinafter referred to as "engine start-up required time"), required to begin increasing the engine rotation speed $N_E$ for the engine ignition to be initiated, approaches the engine start-up required time for the non-shifting of the automatic shifting portion 20. This is because a residence time of the engine rotation speed $N_E$ involved in a resonating frequency band, covering a rotating speed range of the engine 8 with vibration caused by engine rotation being amplified due to a resonance, can be shortened in the same manner as that achieved in the non-shifting of the automatic shifting portion 20. This prevents vibration of the engine 8 from increasing during the engine start-up and ensures the engine start-up control means 146 has the same response as that obtained for the non-shifting of the automatic shifting portion 20.

In light of first-motor torque $T_{M1}$ and second-motor torque $T_{M2}$, the second-motor rotation speed $N_{M2}$ of the second electric motor M2, forming a ring shaft (third rotary element RE3) of the differential portion 11, varies during the shifting of the automatic shifting portion 20 in a pattern different from that of the second-motor rotation speed $N_{M2}$ appearing during the non-shifting of the automatic shifting portion 20. Accordingly, if first-motor torque $T_{M1}$ and second-motor torque $T_{M2}$ for the shifting are controlled in the same way as that of the non-shifting, the time required for the engine rotation speed $N_E$ for start-up of the engine to exceed the engine start-up rotation speed NE1 becomes longer than that required for the control executed during the non-shifting of the automatic shifting portion 20.

Figure 13:
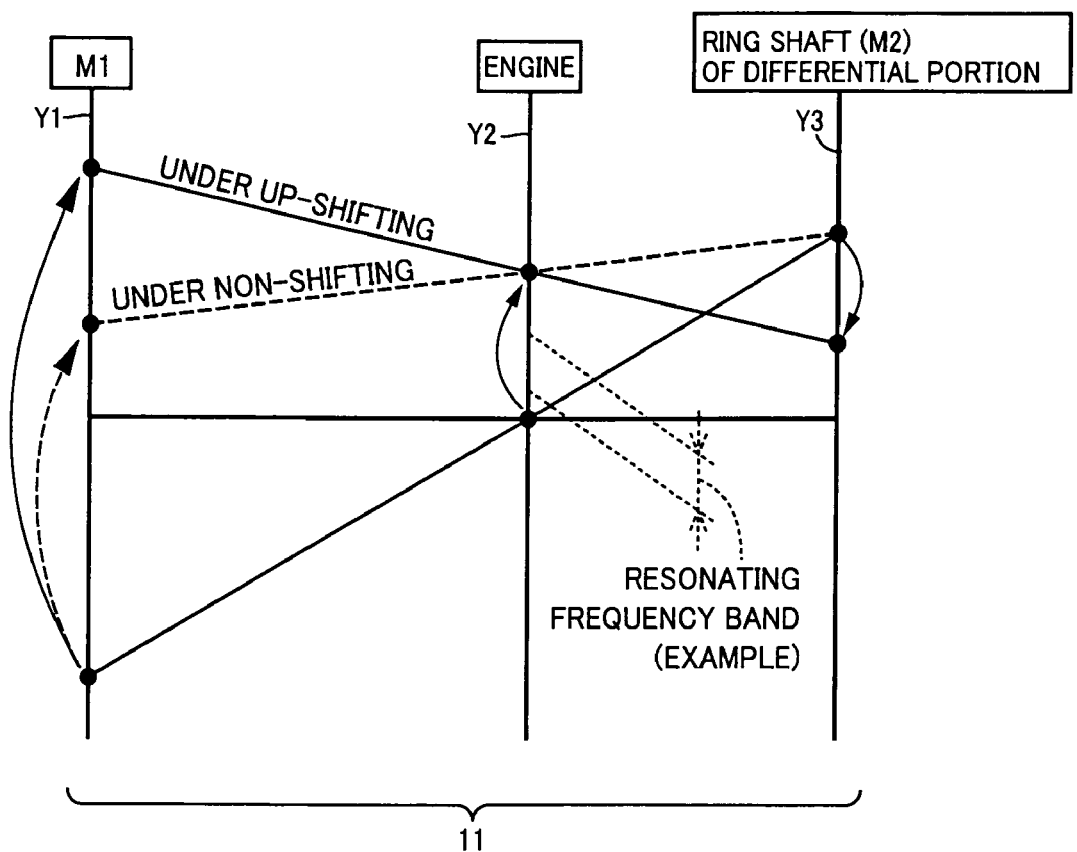
FIG. 13 is a collinear chart for illustrating relative rotation speeds of various rotary elements of a differential portion when increasing the engine rotation speed during an up-shift of the automatic shifting portion in the hybrid vehicle power transmitting device shown in FIG. 1 with vertical lines Y1 to Y3 corresponding to Y1 to Y3 shown in FIG. 3.

During, for instance, an up-shift operation with the shifting executed to decrease the speed ratio γ in the automatic shifting portion 20, the engine rotation speed $N_E$ is increased as shown in FIG. 13. That is, the engine rotation speed $N_E$ is increased in accordance with a drop in the second-motor rotation speed $N_{M2}$ (rotation speed of the ring shaft of the differential portion 11) caused by the shifting effectuated in the automatic shifting portion 20. To this end, the first-motor rotation speed $N_{M1}$ needs to increase to a higher speed level than that needed for the non-shifting of the automatic shifting portion 20. Therefore, in order to cause the engine rotation speed $N_E$ to exceed the engine start-up rotation speed NE1 for the same required time as that needed for the non-shifting, first-motor torque $T_{M1}$ and second-motor torque $T_{M2}$, counteracting first-motor torque $T_{M1}$, need to increase to a higher speed level during the shifting than that needed for the non-shifting.

Further, when increasing the engine rotation speed $N_E$ during the down-shift operation with the shifting executed so as to increase the speed ratio γ of the automatic shifting portion 20, the second-motor rotation speed $N_{M2}$ needs to increase for the automatic shifting portion 20 to execute the shifting. To this end, second-motor torque $T_{M2}$ for the shifting is caused to increase to a higher speed level than that achieved for the non-shifting, and first-motor torque $T_{M1}$, counteracting second-motor torque $T_{M2}$, needs to increase.

The controls on first-motor torque $T_{M1}$ and second-motor torque $T_{M2}$ will be described below further in detail. Under a circumstance where the engine start-up determining means 140 determines that the engine start-up determination is made, the shifting state determining means 142 makes a determination affirming that the shifting is executed in the automatic shifting portion 20, and the motor limited-state determining means 144 makes a determination denying that the drive forces of the first and second electric motors M1 and M2 are limited. In this moment, the engine start-up control means 146 needs to allow the time required for start-up of the engine to be closer to the time required for start-up of the engine during the non-shifting of the automatic shifting portion 20.

To this end, the engine start-up control means 146 performs a control based on an input rotation speed variation gradient representing an absolute value of a variable range of the second-motor rotation speed $N_{M2}$ per unit time indicative of the input rotation speed of the automatic shifting portion 20. This control is executed such that the greater the input rotation speed variation gradient, the greater will be first-motor torque $T_{M1}$ and second-motor torque $T_{M2}$. To compare this control to the control executed for the non-shifting of the automatic shifting portion 20, when the automatic shifting portion 20 remains under the non-shifting mode, almost no variation takes place in the second-motor rotation speed $N_{M2}$, bound with the vehicle speed V (velocity of the drive wheel 34), unless a variation takes place in the vehicle speed V. Therefore, the input rotation speed variation gradient, appearing under the non-shifting of the automatic shifting portion 20, is less than the input rotation speed variation gradient appearing when the shifting is executed in the automatic shifting portion 20. Accordingly, it can be said that when increasing the engine rotation speed $N_E$ for the shifting of the automatic shifting portion 20, the engine start-up control means 146 performs the control to increase first-motor torque $T_{M1}$ and second-motor torque $T_{M2}$ to be greater than those for the non-shifting of the automatic shifting portion 20.

Figure 14:
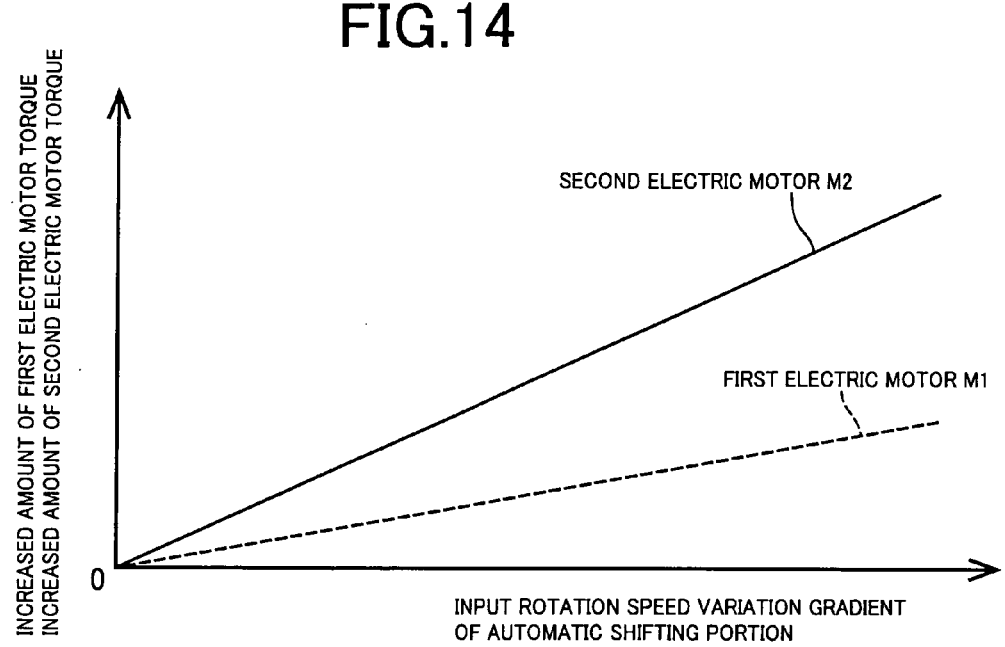
FIG. 14 is a view showing an example of the relationship between an input rotation speed variation gradient of the automatic shifting portion and increments of first-motor torque and second-motor torque appearing when increasing the engine rotation speed for start-up of the engine during the shifting of the automatic shifting portion during the control operations executed with the electronic control device shown in FIG. 4.

In FIG. 14, the input rotation speed variation gradient is plotted on the horizontal axis. The vertical axis is plotted with increments of first-motor torque $T_{M1}$ and second-motor torque $T_{M2}$ for the shifting in contrast to those for the non-shifting of the automatic shifting portion 20. The increment of second-motor torque $T_{M2}$ is higher than that of first-motor torque $T_{M1}$. This represents one example and a reverse case may be possible. The engine start-up control means 146 preliminarily stores the relationship between the input rotation speed variation gradient and first-motor torque $T_{M1}$ and second-motor torque $T_{M2}$.

Meanwhile, if the shifting state determining means 142 makes a determination denying that the shifting is executed in the automatic shifting portion 20, the operation is executed to control the drive forces of the first and second electric motors M1 and M2 for start-up of the engine in a manner described below. When the engine start-up determining means 140 determines that the engine start-up determination is made, almost no variation takes place in the second-motor rotation speed $N_{M2}$, bound with the vehicle speed V (velocity of the drive wheel 34), unless a variation occurs in the vehicle speed V. Accordingly, the engine start-up control means 146 performs the control to allow first-motor torque $T_{M1}$ to be lower than that for the shifting executed in the automatic shifting portion 20. Further, since the reverse drive force, transferred from the drive wheels 34 to the engine 8, can be utilized to increase the engine rotation speed $N_E$, the engine start-up control means 146 performs the control to allow second-motor torque $T_{M2}$ to be lower than that for the shifting executed in the automatic shifting portion 20.

When the engine start-up determining means 140 determines execution of the engine start-up determination, the shifting state determining means 142 makes a determination affirming that the shifting is executed in the automatic shifting portion 20. Further, the motor limited-state determining means 144 makes a determination affirming that the drive force of the first electric motor M1 or the second electric motor M2 is limited. In such a case, the shift control altering means 148 operates in a manner described below. The shift control to be executed in the automatic shifting portion 20 is altered for a phase in which the drive forces of the first and second electric motors M1 and M2 are not limited, i.e. a phase in which the first and second electric motors M1 and M2 are available to provide predetermined drive forces.

More particularly, the shift control altering means 148 alters the shift control of the automatic shifting portion 20. That is, the shift control is altered such that the greater the limiting rate of the drive force of the first electric motor M1 or the second electric motor M2, i.e. the lower the drive force available to be output from the first electric motor M1 or the second electric motor M2, the lower will be the input rotation speed variation gradient of the automatic shifting portion 20 with respect to a case in which no drive forces of the first and second electric motors M1 and M2 are limited, or the longer will be the time required for the shifting of the automatic shifting portion 20. For instance, the shifting control can be altered upon preparing the relationship, shown in FIG. 15, which varies such that the greater the limiting rate of the drive force of the first electric motor M1 or the second electric motor M2, i.e. the greater the motor output limiting amount, the less will be hydraulic pressure gradient representing a varying ratio of a hydraulic pressure per unit time being supplied to the clutch or the brake related to the shifting operation of the automatic shifting portion 20.

Further, when the shift control altering means 148 alters the shift control of the automatic shifting portion 20, an engine start-up control for start-up of the engine 8 is executed based on the engine start-up determination in parallel to the execution of the shifting in the automatic shifting portion 20 within limited ranges of the drive forces of the first and second electric motors M1 and M2. More particularly, in accordance with the shifting executed in the automatic shifting portion 20, the first electric motor M1 is driven in the same rotational direction as that of the second electric motor M2. This causes the engine 8 to rotate in the same rotational direction as those of the first and second electric motors M1 and M2 to allow the engine ignition to be initiated at time when the engine rotation speed $N_E$ increases beyond the engine start-up rotation speed NE1.

Figure 15:
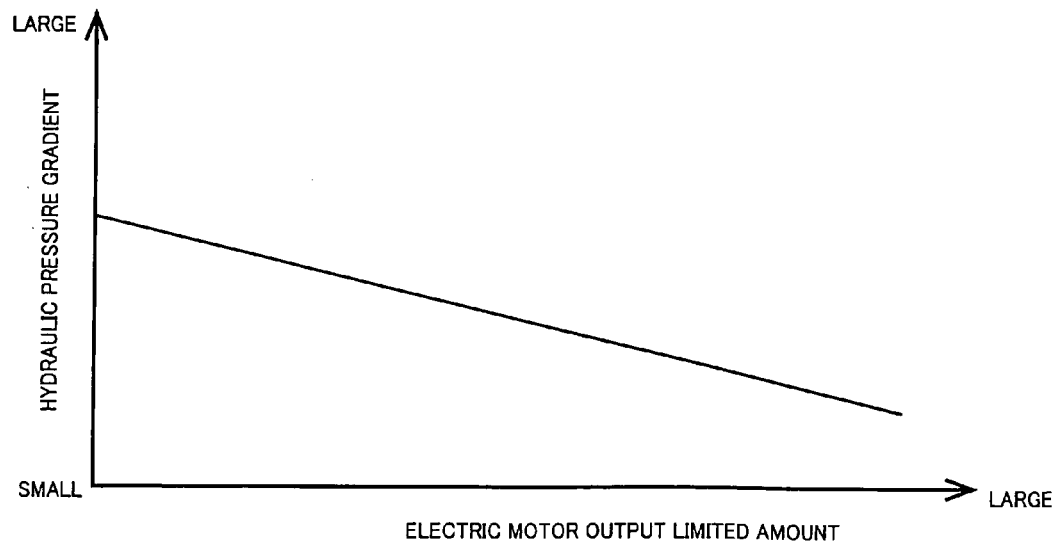
FIG. 15 is a view showing an example of the relationship between a motor output limiting amount and a hydraulic pressure gradient of a hydraulic pressure supplied to a clutch or a brake related to a shifting operation of the automatic shifting portion appearing when increasing the engine rotation speed for start-up of the engine during the shifting of the automatic shifting portion during the control operations executed with the electronic control device shown in FIG. 4.

In addition, the vertical axis in FIG. 15 is not limited to the hydraulic pressure gradient. Moreover, as the motor output limiting amount to be plotted on the horizontal axis in FIG. 15, it may suffice to employ a limiting amount of any of the drive forces of the first and second electric motors M1 and M2. In an alternative, of the limiting amounts of the drive forces of the first and second electric motors M1 and M2, the limiting amount, marking a greater value, may be adopted.

Figure 16:
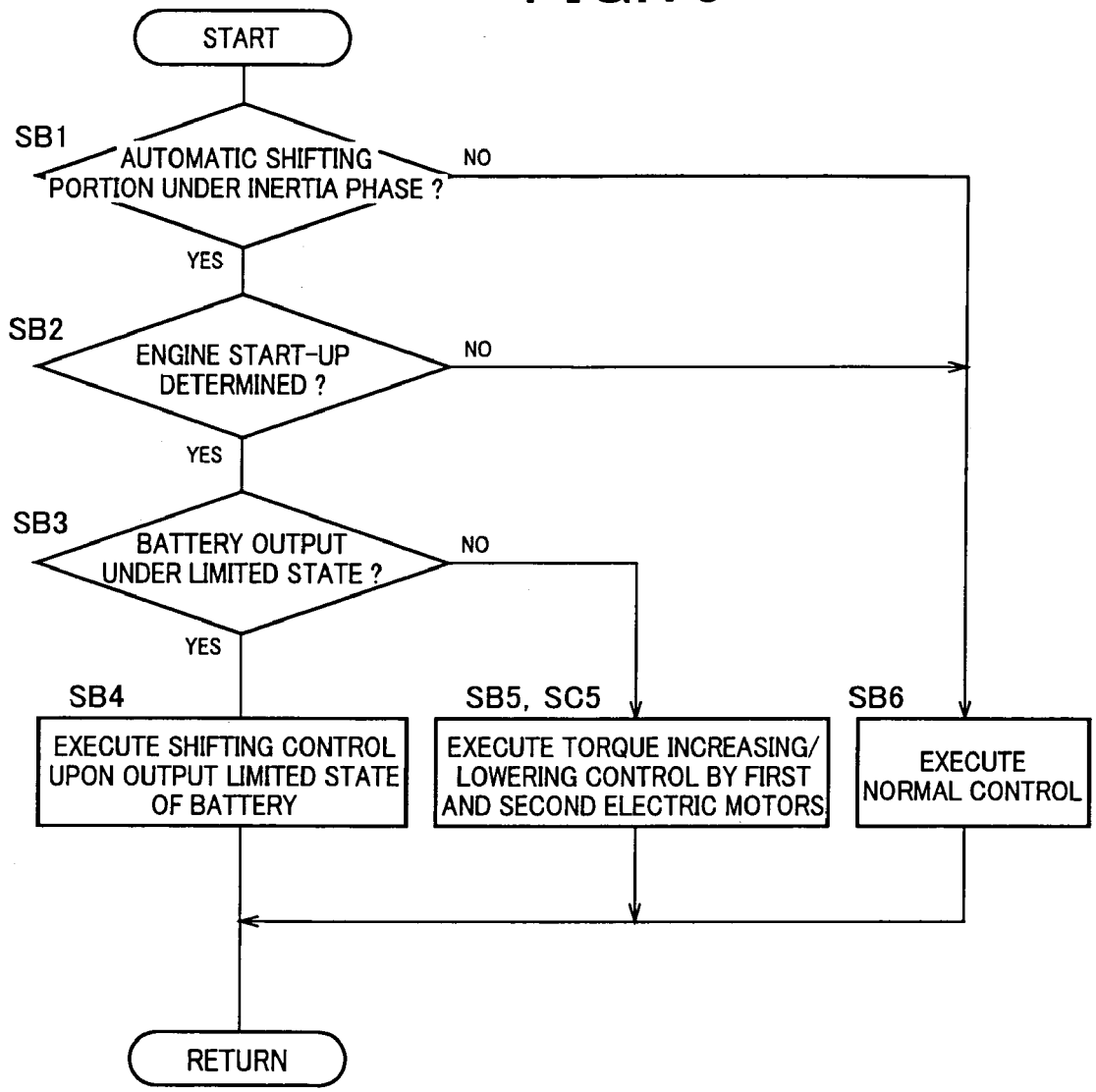
FIG. 16 is a flow chart illustrating the major control functions to be executed with the electronic control unit of FIG. 4, i.e. the control operations to be executed starting up the engine.

FIG. 16 is a flow chart, illustrating a major part of control operations to be executed with the electronic device 110, i.e. a basic sequence of control operations for starting up the engine, which is repeatedly executed on an extremely short cycle period in the order of, for instance, several milliseconds or several tens milliseconds.

First, at step (hereinafter the term "step" will be omitted) SB1 corresponding to the shifting state determining means 142, a query is made as to whether the shifting is executed in the automatic shifting portion 20. In particular, the query is made as to whether the shifting operation of the automatic shifting portion 20 is involved in an inertia phase in the shifting thereof. The query as to whether the shifting operation of the automatic shifting portion 20 falls in such an inertia phase can be made based on a control signal delivered to an electromagnetic valve for controlling the clutch or the brake of the automatic shifting portion 20 and the second-motor rotation speed $N_{M2}$ upon detections thereof. If the answer is YES, i.e. if the automatic shifting portion 20 remains in the shifting, then the flow routine goes to SB2. On the contrary, if this answer is NO, then the flow routine goes to SB6.

At SB2 corresponding to the engine start-up determining means 94, a query is made as to whether the electronic control device 110 determines execution of the engine start-up determination. For instance, if the accelerator pedal is deeply depressed during the motor drive mode, demanded output torque $T_{OUT}$ of the automatic shifting portion 20 increases in line with the accelerator-opening Acc as shown in FIG. 7. This causes the vehicle state to change from the motor drive region to the engine drive region, thereby making the engine start-up determination. If the answer is YES, i.e. if the engine start-up determination is made, then the flow routine goes to SB3. In contrast, if the answer is NO, then the flow routine goes to SB6.

At SB3 corresponding to the motor limited state determining means 144, a query is made as to whether the first and second electric motors M1 and M2, driven with the output delivered from the battery 56, remain under statuses unavailable to obtain the predetermined drive forces. That is, a query is made as to whether the drive force of the first electric motor M1 or the second electric motor M2 is limited. In other words, a query is made as to whether the output delivered from the battery 56, such as chargeable battery, is limited to fall in a state unavailable to obtain the predetermined output from the battery 56. For instance, the output of the battery 56 is limited when the state of charge SOC of the battery 56 is in shortage or when due to an increasing operating temperature of the first electric motor M1 or the second electric motor M2 beyond a given value, the output of such an electric motor is limited. If the answer is YES, i.e. if the drive force of the first electric motor M1 or the second electric motor M2 is limited, in other words, when the output delivered from the battery 56 is limited, the flow routine proceeds to SB4. In contrast, if the answer is NO, then the flow routine goes to SB5.

At SB4 corresponding to shift control altering means 148, the operation is executed to alter the shifting control to be executed with the automatic shifting portion 20. Thus, the greater the limiting rate of the drive force of the first electric motor M1 or the second electric motor M2 driven with the output of the battery 56, i.e. the lower the drive force available to be output from the first electric motor M1 or the second electric motor M2, the less will be the input rotation speed variation gradient of the automatic shifting portion 20 with respect to a case in which no drive force of the first electric motor M1 or the second electric motor M2 is limited or the longer will be the time required for the shifting of the automatic shifting portion 20.

For instance, as shown in FIG. 15, the alteration of the shifting control can be realized by using the hydraulic pressure gradient, representing the varying ratio of the hydraulic pressure per unit time being supplied to the clutch or the brake related to the shifting operation of the automatic shifting portion 20, such that the greater the motor output limiting amount, the less will be hydraulic pressure gradient. In addition, if the shifting control of the automatic shifting portion 20 is altered in SB4, the engine start-up control is executed based on the engine start-up determination in accordance with the shifting executed in the automatic shifting portion 20 within the limited ranges of the drive forces of the first electric motor M1 and the second electric motor M2.

At SB5 corresponding to the engine start-up control means 146, first-motor torque $T_{M1}$ and second-motor torque $T_{M2}$ are controlled so as to cause the first and second electric motors M1 and M2 to rotate in the same rotational direction. This allows the engine 8 to rotate in the same rotational direction as those of the first and second electric motors M1 and M2. Thus, the engine rotation speed $N_E$ is caused to increase beyond the engine start-up rotation speed NE1 available to initiate the engine start, thereby initiating the engine ignition. In this moment, for the time required for start-up of the engine to be closer to the time required for start-up of the engine for the non-shifting of the automatic shifting portion 20, the increments of first-motor torque $T_{M1}$ and second-motor torque $T_{M2}$ are controlled based on the input rotation speed varying gradient of the automatic shifting portion 20 as shown in FIG. 14. Thus, this control is executed such that the greater the input rotation speed varying gradient, the greater will be the increments of first-motor torque $T_{M1}$ and second-motor torque $T_{M2}$.

That is, first-motor torque $T_{M1}$ and second-motor torque $T_{M2}$ are controlled based on the input rotation speed varying gradient such that the greater the input rotation speed varying gradient, the greater will be first-motor torque $T_{M1}$ and second-motor torque $T_{M2}$. That is, with the automatic shifting portion 20 remaining under the non-shifting, almost no variation takes place in the second-motor rotation speed $N_{M2}$, representing the input rotation speed of the automatic shifting portion 20 bound with the vehicle speed V (velocity of the drive wheel 34), unless a variation occurs in the vehicle speed V. Thus, first-motor torque $T_{M1}$ and second-motor torque $T_{M2}$ are controlled to be greater than those for the non-shifting of the automatic shifting portion 20.

At SB6, normal controls are executed. These controls include, for instance, the engine start-up control, executed under the non-shifting of the automatic shifting portion 20, and the shifting control executed in the automatic shifting portion 20 without executing the engine start.

Figure 17:
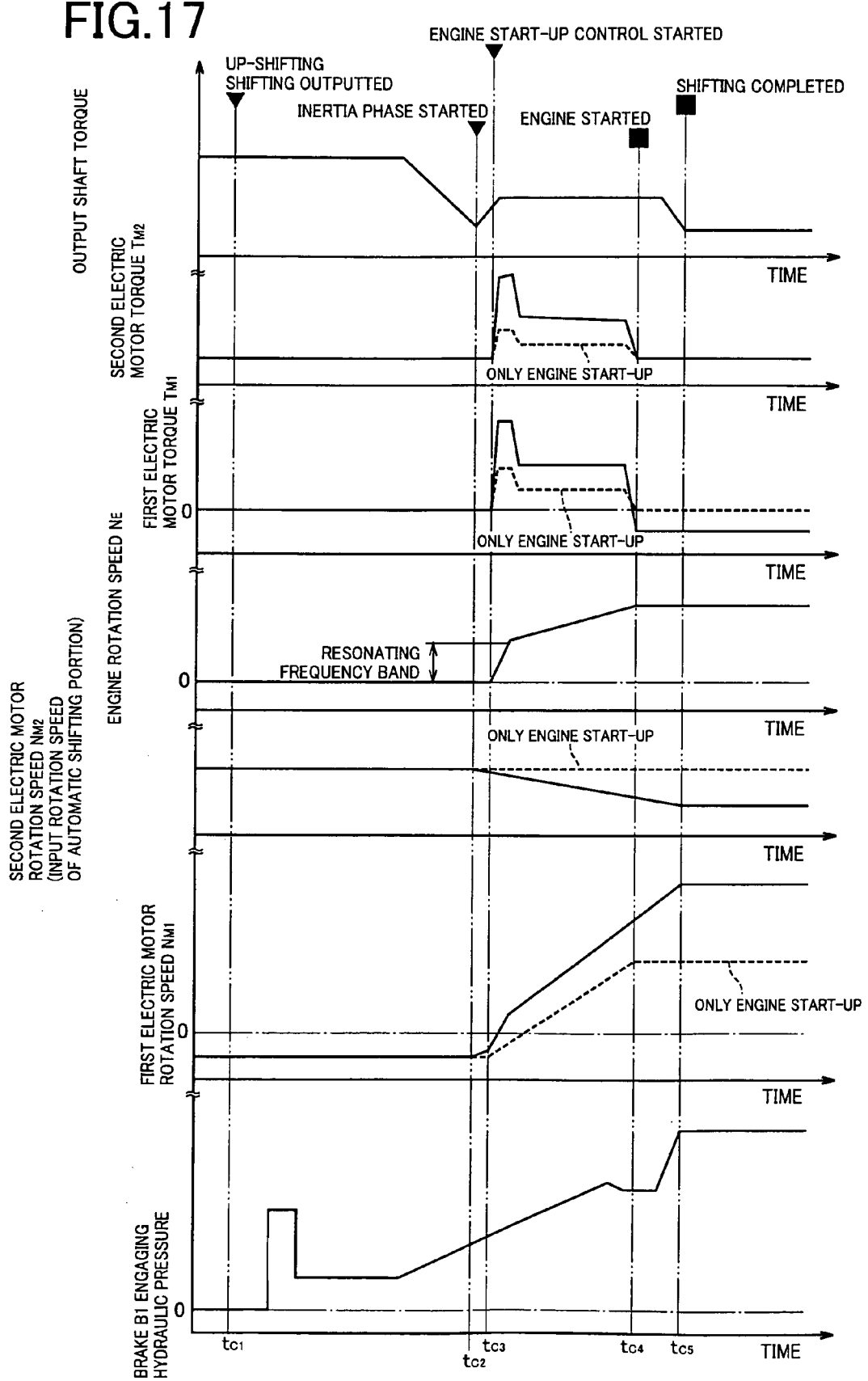
FIG. 17 is a timing chart, illustrating the control operations shown in FIG. 16, which represents an exemplary case wherein the operation is executed to make the engine start-up determination during the up-shift of the automatic shifting portion upon depressing the accelerator pedal during the motor drive mode.

FIG. 17 is a timing chart, illustrating the control operations shown in the flow chart in FIG. 16, which represents an exemplary case wherein the accelerator pedal is depressed during the motor drive mode upon which the engine start-up determination is made during the up-shift operation of the automatic shifting portion 20. FIG. 17 shows the timing chart representing, beginning at the top, torque of the output shaft 22, second-motor torque $T_{M2}$, first-motor torque $T_{M1}$, the engine rotation speed $N_E$, the second-motor rotation speed $N_{M2}$, the first-motor rotation speed $N_{M1}$ and the hydraulic pressure of the first brake B1 of the automatic shifting portion 20.

In FIG. 17, time $t_{C1}$ indicates that a shifting output is being output for commanding the automatic shifting portion 20 to execute the shifting. In particular, the shifting output represents that the up-shift is to be executed. Upon delivery of the shifting output, subsequently, the operation is executed to begin increasing the hydraulic pressure (engaging hydraulic pressure for brake B1) delivered to the first brake B1, acting as a hydraulic pressure type frictional engaging device to be engaged during the shifting operation.

Time $t_{C2}$ indicates that the shifting operation of the automatic shifting portion 20 falls in the inertia phase. This shifting operation is executed for the up-shifting and at $t_{C2}$, the second-motor rotation speed $N_{M2}$, representing the input rotation speed of the automatic shifting portion 20, begins to decrease.

Time $t_{C3}$ indicates that the engine start-up determination is made and the engine start-up control is commenced to start-up the engine 8. Time $t_{C4}$ indicates that the engine rotation speed NE reaches the engine start-up rotation speed NE1 to allow a start-up of the engine 8, i.e. that the engine ignition is initiated. At time $t_{C3}$, the answers to SB1 and SB2 in FIG. 16 are YES and a determination is made in SB3 that the output of the battery 56 is not limited after which SB5 is executed.

Accordingly, when the automatic shifting portion 20 remains under the non-shifting, i.e. when the input rotation speed variation gradient of the automatic shifting portion 20 is zeroed or nearly zeroed, first-motor torque $T_{M1}$ and second-motor torque $T_{M2}$ are controlled during a time period between times time $t_{C3}$ and $t_{C4}$. This allows first-motor torque $T_{M1}$ and second-motor torque $T_{M2}$ to be greater than first-motor torque $T_{M1}$ and second-motor torque $T_{M2}$ achieved when the engine start is initiated (as indicated by a broken line annotated with "with only engine start" in FIG. 17). This allows the first-motor rotation speed $N_{M1}$ to be made higher than that achieved during the engine start initiated under the non-shifting, thereby causing the engine rotation speed $N_E$ to be closer to that achieved during the non-shifting. In addition, immediately after time $t_{C3}$, first-motor torque $T_{M1}$ and second-motor torque $T_{M2}$ are controlled to be temporarily increase so that the engine rotation speed $N_E$ is caused to immediately transit the resonating frequency band.

In FIG. 17, time $t_{AC5}$ indicates that the automatic shifting portion 20 has completed the shifting operation. With the shifting completed in the automatic shifting portion 20, the engagement of the brake B1 is completed with the hydraulic pressure kept constant at time $t_{C5}$ and later. Thus, the second-motor rotation speed $N_{M2}$, bound with the vehicle speed V (velocity of the drive wheel 34), is kept constant at time $t_{C5}$ and later. Then, at time $t_{C5}$ and later, both the engine rotation speed $N_E$ and the second-motor rotation speed $N_{M2}$ are kept constant and the first-motor rotation speed $N_{M1}$, determined based on such parameters, is also kept constant. In addition, the shifting operation in the automatic shifting portion 20 belongs to the up-shift, and torque of the output shaft 22 in time after time $t_{C5}$, indicating the completion of the shifting operation, is made lower than that appearing before the execution of the shifting.

Figure 18:
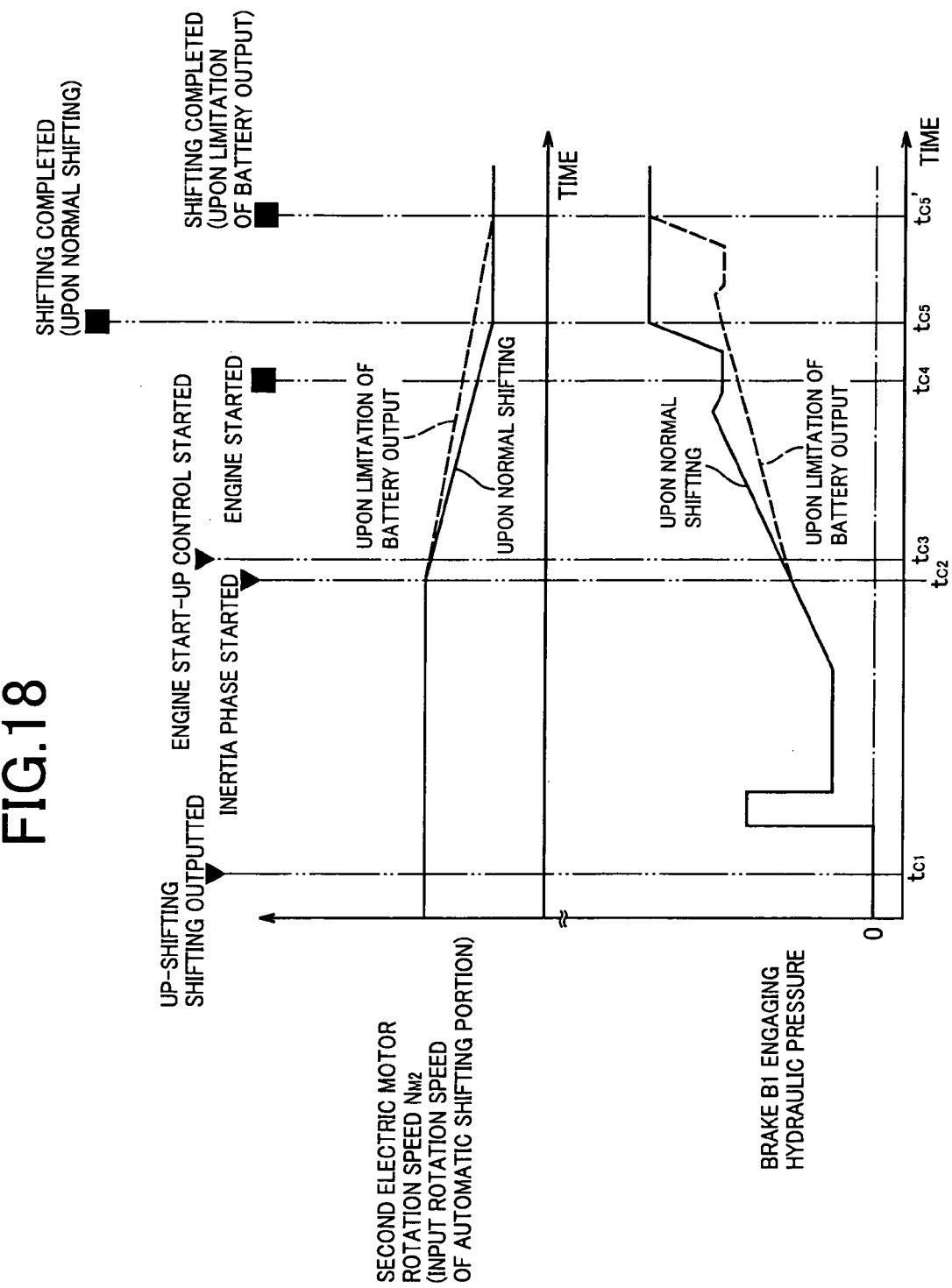
FIG. 18 is another timing chart different from FIG. 17, illustrating the control operations shown in FIG. 16, which represents an exemplary case wherein the operation is executed in the timing chart shown in FIG. 17 to determine that an output of a battery is limited.

FIG. 18 is a timing chart for illustrating the control operations shown in the flow chart of FIG. 16, which represents an exemplary case wherein the determination is made in the flow chart shown in FIG. 17 that the drive force of the first electric motor M1 or the second electric motor M2 is limited, i.e. wherein the output delivered from the battery 56 is limited. Accordingly, times $t_{C1}$ to $t_{C5}$ of FIG. 18 are common to those of FIG. 17. Hereunder, the flow chart of FIG. 18 will be described below with a focus on points different from that of FIG. 17. Also, solid lines annotated with "during normal shifting" represent timing at which the output of the battery 56 is not limited, which is identical to the flow chart of FIG. 17.

The determination is made in SB3, shown in FIG. 16, that the output delivered from the battery 56 such as the rechargeable battery, after which SB4 is executed. This decreases the hydraulic pressure gradient of the hydraulic pressure delivered to the first brake B1 so as to decrease the input rotation speed variation gradient of the automatic shifting portion 20. Consequently, a timing chart for a brake-B1-hydraulic pressure, prevailing in a period between the beginning of the inertia phase and the completion of the shifting in the automatic shifting portion 20, belongs to a timing chart indicated by solid lines during a period from time $t_{C2}$ to time $t_{C5}$ during the normal shifting, i.e. when the output of the battery 56 is not limited.

On the contrary, since the shifting control of the automatic shifting portion 20 is altered upon executing SB4, the second-motor rotation speed $N_{M2}$ and the brake-B1-hydraulic pressure vary during a period between time $t_{C2}$ to time $t_{C5}'$ in a manner as shown in timing charts indicated by broken lines. Thus, the time required for the completion of the shifting is delayed from time $t_{C5}$ to time $t_{C5}'$ in an extended length of time. However, the input rotation speed variation gradient of the automatic shifting portion 20, representing a slope of the timing chart (indicated by a broken line annotated with "under limited state of battery output") the second-motor rotation speed $N_{M2}$ with no operation being executed in SB4, is made lower than that when SB4 is executed (as indicated by a solid line annotated with "for normal operation"). That is, it can be said that altering the shifting control of the automatic shifting portion 20 in SB4 causes the input rotation speed variation gradient of the automatic shifting portion 20 to approach to that when the automatic shifting portion 20 remains under the non-shifting.

The electronic control device 110 of the second embodiment has various advantageous effects (B1) to (B9) as listed below.

(B1) Under a circumstance where the engine rotation speed $N_E$ for start-up of the engine is caused to increase, the drive force of the first electric motor M1 for starting up the engine 8 is controlled depending on the shifting state of the automatic shifting portion 20. This prevents the shifting operation of the automatic shifting portion 20 from adversely affecting the increase in the engine rotation speed $N_E$. During the operation to start-up the engine 8, for instance, the engine rotation speed $N_E$ is caused to immediately increase even during the shifting of the automatic shifting portion 20, properly starting up the engine 8.

(B2) When increasing the engine rotation speed $N_E$ for start-up of the engine 8 during the shifting of the automatic shifting portion 20, first-motor torque $T_{M1}$ is controlled based on the input rotation speed variation gradient of the automatic shifting portion 20. This causes the second-motor rotation speed $N_{M2}$, representing the input rotation speed of the automatic shifting portion 20, to significantly increase, with an accompanying increase in first-motor torque $T_{M1}$ needed for increasing the engine rotation speed $N_E$. Even in this case, the engine rotation speed $N_E$ is caused to immediately increase, properly starting up the engine 8.

(B3) When increasing the engine rotation speed $N_E$ for start-up of the engine 8 during the shifting of the automatic shifting portion 20, first-motor torque $T_{M1}$ is controlled such that the engine start-up required time, representing the time required for beginning to increase the engine rotation speed $N_E$ and initiating the engine ignition, approaches the engine start required time for the non-shifting of the automatic shifting portion 20. Thus, the engine 8 can be started up with same response as that achieved for the automatic shifting portion 20 remaining under the non-shifting mode.

(B4) When increasing the engine rotation speed $N_E$ for start-up of the engine 8 during the shifting of the automatic shifting portion 20, first-motor torque $T_{M1}$ is made greater than that for the non-shifting of the automatic shifting portion 20. Thus, even if a variation occurs in the second-motor rotation speed $N_{M2}$ representing the input rotation speed of the automatic shifting portion 20 due to the shifting operation of the automatic shifting portion 20, the engine rotation speed $N_E$ is caused to immediately increase, properly starting up the engine 8.

(B5) Under a circumstance where the engine rotation speed $N_E$ for start-up of the engine 8 is caused to increase during the shifting of the automatic shifting portion 20, it is provable that the drive force of the first electric motor M1 is limited. In this case, the shifting control of the automatic shifting portion 20 is altered so as to decrease the input rotation speed variation gradient of the automatic shifting portion 20 with respect to a case wherein no drive force is limited or to extend the time required for the shifting of the automatic shifting portion 20. This prevents the variation in the second-motor rotation speed $N_{M2}$, representing the input rotation speed of the automatic shifting portion 20, from adversely affecting the increase in the engine rotation speed $N_E$ in a further effective fashion than that achieved when no shifting control is altered.

(B6) When the engine rotation speed $N_E$ for start-up of the engine 8 is caused to increase, the second electric motor M2 is controlled depending on the shifting state of the automatic shifting portion 20 to provide the drive force as the reactive force counteracting the drive force of the first electric motor M1. This results in a capability of preventing rotational resistance of the engine 8 from adversely affecting the shifting operation of the automatic shifting portion 20. When starting up the engine 8, for instance, the engine rotation speed $N_E$ is caused to immediately increase even if the shifting is executed in the automatic shifting portion 20, properly starting up the engine 8.

(B7) When increasing the engine rotation speed $N_E$ for start-up of the engine 8 during the shifting of the automatic shifting portion 20, second-motor torque $T_{M2}$ is controlled based on the input rotation speed variation gradient of the automatic shifting portion 20. This results in an increase in the second-motor rotation speed $N_{M2}$ representing the input rotation speed of the automatic shifting portion 20, with accompanying increase in second-motor torque $T_{M2}$ needed for counteracting rotational resistance of the engine 8 and first-motor torque $T_{M1}$. Even under such a situation, it becomes possible to prevent rotational resistance of the engine 8 from adversely affecting the shifting operation of the automatic shifting portion 20. This allows the engine rotation speed $N_E$ to immediately increase, with an accompanying capability of properly starting up the engine 8.

(B8) When increasing the engine rotation speed $N_E$ for start-up of the engine 8 during the shifting of the automatic shifting portion 20, second-motor torque $T_{M2}$ is caused to be greater than that appearing during the non-shifting of the automatic shifting portion 20. Thus, even if a need arises to vary the second-motor rotation speed $N_{M2}$ representing the input rotation speed of the automatic shifting portion 20 for establishing the shifting operation in the automatic shifting portion 20, it becomes possible to prevent rotational resistance of the engine 8 from adversely affecting the shifting operation of the automatic shifting portion 20. This allows the engine rotation speed $N_E$ to immediately increase, with an accompanying capability of properly starting up the engine 8.

(B9) When increasing the engine rotation speed $N_E$ for start-up of the engine 8 during the shifting of the automatic shifting portion 20, the shifting control of the automatic shifting portion 20 is altered. This causes the input rotation speed variation gradient of the automatic shifting portion 20 in the presence of a limited drive force of the second electric motor M2 to be less than that appearing in the absence of such a limited drive force. Thus, the increase in the engine rotation speed $N_E$ is less susceptible to an adversely affect from a variation in the second-motor rotation speed $N_{M2}$, representing the input rotation speed of the automatic shifting portion 20, than the variation in the second-motor rotation speed $N_{M2}$ in the absence of the alteration in such a shifting control. This results in a capability of avoiding the drive force of the first electric motor M1 and rotational resistance of the engine 8, both counteracting the drive force of the second electric motor M2, from adversely affecting the input rotation speed of the automatic shifting portion 20 for establishing the shifting operation after the shifting control of the automatic shifting portion 20 has been altered. This results in a reduction in likelihood of an increase in shifting shock.

Third Embodiment

A third embodiment takes the form of a structure wherein the electronic control device 110 of the second embodiment is replaced by an electronic control device 130. The third embodiment has the structure including engine start-up control means 162, provided in place of the engine start-up control means 146 in the functional block diagram shown in FIG. 12 related to the second embodiment, and the other same component parts, such as the engine start-up determining means 140, the shifting state determining means 142, the motor limited state determining means 144 and the shifting control altering means 148, as those of the second embodiment shown in FIG. 12. Hereunder, description will be given of the third embodiment with a focus on differing points.

The engine start-up determining means 140 determines that the engine start-up determination is made and the shifting state determining means 142 makes a determination affirming that the shifting is executed in the automatic shifting portion 20. In addition, the motor limited state determining means 144 makes a determination denying the limitation in the drive force of the first electric motor M1 or the second electric motor M2. Under such situations, the structure of the second embodiment allows the engine start-up control means 146 to operate in a specified manner. That is, during a time period between the beginning of the increase in the engine rotation speed $N_E$ for start-up of the engine and the time required for the engine rotation speed $N_E$ to exceed the engine start-up rotation speed NE1, first-motor torque $T_{M1}$ and second-motor torque $T_{M2}$ relevant to the shifting are controlled to be greater than those relevant to the non-shifting of the automatic shifting portion 20.

On the contrary, with the third embodiment, the engine start-up control means 162 performs a control to alter first-motor torque $T_{M1}$ and second-motor torque $T_{M2}$ to be greater than those relevant to the non-shifting of the automatic shifting portion 20. In other respects, the engine start-up control means 162 has the same function as that of the engine start-up control means 146.

A basic sequence of control operations is executed with the electronic control device 110 on the same flow chart as that shown in FIG. 16, related to the second embodiment, wherein SB5 is replaced by the routine SC5 while executing the other same routines as those of SB1 to SB4 and SB6 executed in the second embodiment. Hereunder, description will be given of such control operations with a focus on differing points.

If the answer to SB3 is NO, then, in SB5 of the second embodiment, first-motor torque $T_{M1}$ and second-motor torque $T_{M2}$ relevant to the shifting are controlled during the time period between the beginning of the increase in the engine rotation speed $N_E$ for start-up of the engine and the time required for the engine rotation speed $N_E$ to exceed the engine start-up rotation speed NE1. Thus, first-motor torque $T_{M1}$ and second-motor torque $T_{M2}$ relevant to the shifting become greater than those relevant to the non-shifting of the automatic shifting portion 20.

In contrast, at SC5 of the third embodiment, the control is performed during a period in which the engine rotation speed $N_E$ lies in the resonating frequency band. This allows first-motor torque $T_{M1}$ and second-motor torque $T_{M2}$ to be altered to be greater than those relevant to the non-shifting of the automatic shifting portion 20. In other respect, SC5 is identical to SB5. Also, SC5 corresponds to the engine start-up control means 162.

Figure 19:
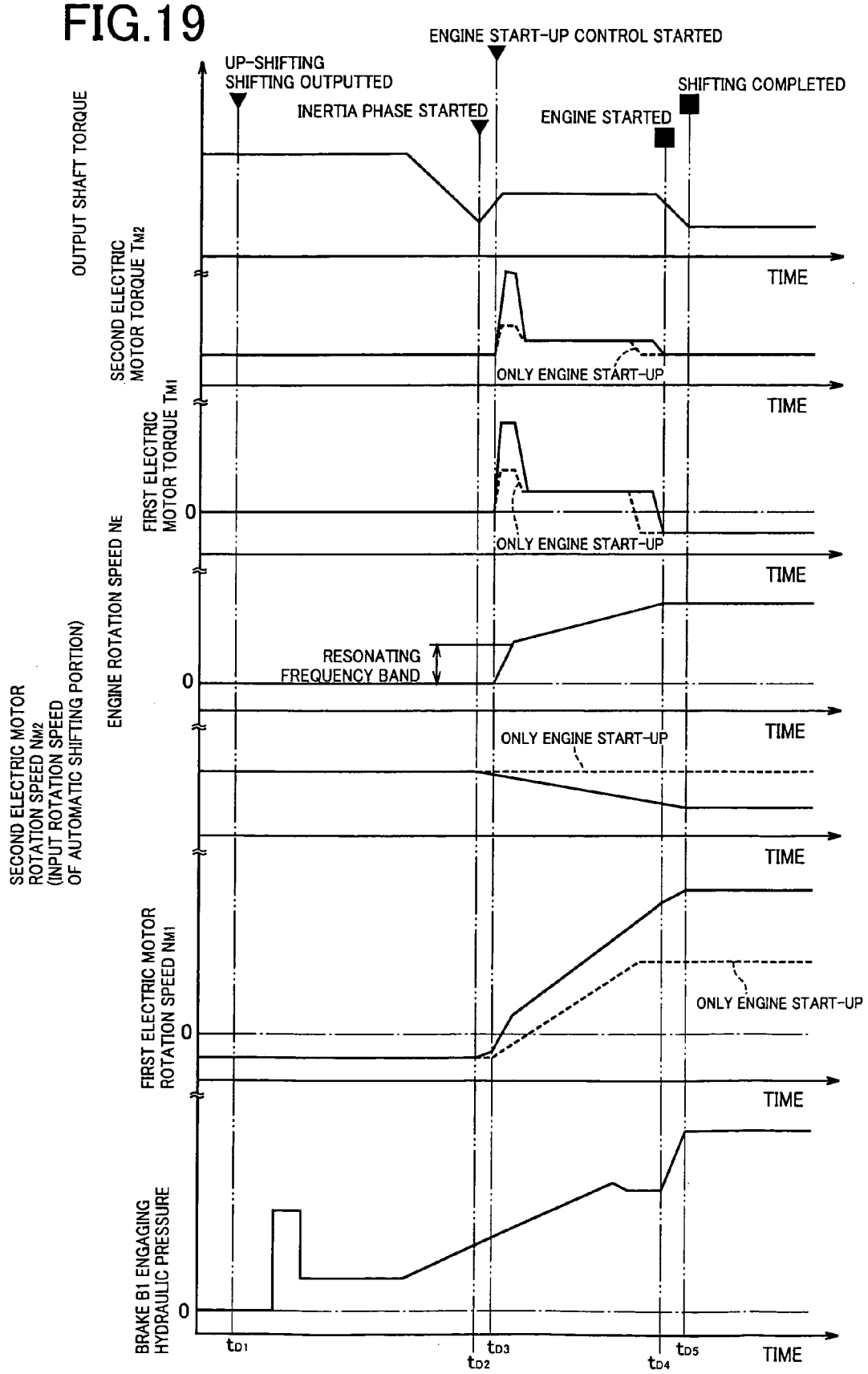
FIG. 19 is a timing chart, illustrating the control operations of the electronic control device shown in the flow chart of FIG. 16, which is a timing chart of a third embodiment representing an embodiment different from that shown in FIG. 17.

FIG. 19 is a timing chart illustrating the control operations of the electronic control device 110 shown in the flow chart of FIG. 16. In FIG. 19, times $t_{D1}$, $t_{D2}$, $t_{D3}$ and $t_{D5}$ correspond to times $t_{C1}$, $t_{C2}$, $t_{C3}$ and $t_{C5}$ of FIG. 17. Hereunder, FIG. 19 will be described below with a focus on differing points.

In FIG. 19, time $t_{D3}$ indicates that the engine start-up control is commenced and $t_{D4}$ indicates that the engine rotation speed $N_E$ exceeds the engine start-up rotation speed NE1 to cause the engine 8 to start-up, i.e. that the engine ignition is initiated. Here, if at time $t_{D3}$, the answers to SB1 and SB2 in FIG. 16 are YES and a determination is made at SB3 that no output of the battery 56 is limited, then, SC5 is executed. Therefore, during a period in which immediately after the time $t_{D3}$ representing the beginning of the engine start-up control, the engine rotation speed $N_E$ falls in a range of the resonating frequency band, the control is executed to alter first-motor torque $T_{M1}$ (indicated by a solid line) and second-motor torque $T_{M2}$ (indicated by a broken line) to be greater than those in the phase (indicated by a broken line) in which the automatic shifting portion 20 remains under the non-shifting.

However, in FIG. 19, when the engine rotation speed $N_E$ passes across the resonating frequency band, first-motor torque $T_{M1}$ (indicated by the solid line) and second-motor torque $T_{M2}$ (indicated by the broken line) are made to be closer to torque for the automatic shifting portion 20 remaining under the non-shifting. This routine is different from that of FIG. 17 in this respect. Thus, first-motor torque $T_{M1}$ and second-motor torque $T_{M2}$ are altered in the specified period to be greater than those in the phase in which the automatic shifting portion 20 remains under the non-shifting. This specified period lies in the range in which the engine rotation speed $N_E$ belongs to the resonating frequency band immediately after the engine start-up control has been begun and does not extend to a time at which the engine 8 is started up. As a result of such operation, the engine start required time, equivalent to a time interval starting time $t_{D3}$ to time $t_{D4}$ shown in FIG. 19, is extended to be longer than the engine start required time related to a time interval starting from time $t_{C3}$ to time $t_{C4}$ shown in FIG. 17.

The electronic control device 110 of the third embodiment has, in addition to the advantageous effects (B1) to (B9) of the second embodiment, other advantageous effects (C1) and (C2) as listed below.

(C1) When, for starting up the engine 8, increasing the engine rotation speed $N_E$ during the shifting of the automatic shifting portion 20, first-motor torque $T_{M1}$ is altered to be greater than that relevant to the non-shifting of the automatic shifting portion 20. This results in a capability of causing the engine rotation speed $N_E$ to immediately pass across the resonating frequency band, thereby enabling a reduction in likelihood of causing damage to a comfort caused by vibration occurring at the start-up of the engine 8.

(C2) When, for starting up the engine 8, increasing the engine rotation speed $N_E$ during the shifting of the automatic shifting portion 20, the engine rotation speed $N_E$ is liable to stay in the range of the resonating frequency band in a specified period. During such a period, second-motor torque $T_{M2}$ is altered to be greater than that relevant to the non-shifting of the automatic shifting portion 20. This causes the engine rotation speed $N_E$ to immediately pass across the resonating frequency band, thereby enabling a reduction in likelihood of causing damage to a comfort due to vibration occurring at the start-up of the engine 8.

<Other Modifications, Improvements>

Heretofore, some embodiments of the present invention have been explained with reference to attached drawings. Noted that these embodiments are no more than illustration, and the present invention can be carried out after adding various alterations and improvements to them, based on knowledge of the person skilled in the art.

For example, with the first to third embodiments, both the first and second electric motors M1 and M2 are provided in the differential portion 11. However, the first and second electric motor M1 and M2 are not required to be disposed in the part of the differential portion 11, and they can be disposed in the shifting mechanism 10 separate from the differential portion 11.

With the first to third embodiments, the differential portion 11 may include, for instance, a differential action limiting device such as a clutch or the like for limiting or interrupting a relative rotation between the first and second rotary elements RE1 and RE2. With such a structure, when increasing the engine rotation speed $N_E$ for start-up of the engine, the differential action limiting device can limit or interrupt the relative rotation between the first and second rotary elements RE1 and RE2 in a non-differential state under which the first to third rotary elements RE1 to RE3 are operative to unitarily rotate.

Under such a non-differential state, using either one of the first and second electric motors M1 and M2 enables an increase in the engine rotation speed $N_E$ for start-up of the engine. Using, for instance, the second electric motor M2 with no use of the first electric motor M1 enables a control to be performed for increasing the engine rotation speed $N_E$. This allows the electronic control device 80 to have less control load than that required when using both the first and second electric motors M1 and M2.

With the first embodiment, further, when performing the engine start-up during the shifting of the automatic shifting portion 20, a driver has an expectation of an increase in drive torque as rapidly as possible. Therefore, it may be possible to achieve improvement in response upon increasing the engine rotation speed $N_E$ with the use of the first and second electric motors M1 and M2 on an earlier stage than that achieved the shifting and the engine start-up are independently initiated while accelerating the initiations of the shift completion timing and the engine ignition timing.

With the first to third embodiments, although the second electric motor M2 is connected to the power transmitting member 18, the present invention can be applied to the power transmitting device not including the second electric motor M2.

With the first to third embodiments, although the second electric motor M2 is directly connected to the power transmitting member 18, the connecting position of the second electric motor M2 is not limited to such mode. That is, the second electric motor M2 is sufficiently connected to the power transmitting path extending from the engine 8 or the power transmitting member 18 to the drive wheel 38, directly or indirectly via the transmission, planetary gear unit, engaging device and the like.

With the first to third embodiments, while the differential portion 11 is configured to function as the electrically controlled continuously variable transmission in which the speed ratio $\gamma 0$ is continuously varied from the minimal value $\gamma 0_{min}$ to the maximal value $\gamma 0_{max}$, the present invention may be applied even to a case wherein the speed ratio $\gamma 0$ of the differential portion 11 is not continuously varied but pretended to vary step-by-step with the use of a differential action.

With the power distribution mechanisms 16 of the first to third embodiments, the differential-portion carrier CA0 is connected to the engine 8; the differential-portion sun gear S0 is connected to the first electric motor M1; and the differential-portion ring gear R0 is connected to the power transmitting member 18. However, the present invention is not necessarily limited to such connecting arrangement, and the engine 8, first electric motor M1 and power transmitting member 18 have no objection to be connected to either one of the three elements CA0, S0 and R0 of the differential-portion planetary gear set 24.

In the first to third embodiments, although the engine 8 is directly connected to the input shaft 14, these component parts may suffice to be operatively connected via, for instance, gears, belts or the like. The engine 8 and the input shaft 14 need not be disposed on a common axis.

Further, while in the first to third embodiments, with the first electric motor M1 and the second electric motor M2 being disposed coaxial with the input shaft 14, the first electric motor M1 is connected to the differential-portion sun gear S0, and the second electric motor M2 is connected to the power transmitting member 18. However, no need arises for these component parts to be necessarily placed in such connecting arrangement. For example, the first electric motor M1 may be connected to the differential-portion sun gear S0 through gears, a belt or the like, and the second electric motor M2 may be connected to the power transmitting member 18.

In the first to third embodiments, further, the hydraulically operated frictional coupling devices such as the first and second clutches C1, C2 may include magnetic type clutches such as powder (magnetic powder) clutches, electromagnetic clutches and meshing type dog clutches, and electromagnetic type and mechanical coupling devices. For instance, with the electromagnetic clutches being employed, the hydraulic control circuit 70 may not include a valve device for switching hydraulic passages and may be replaced with a switching device or electromagnetically operated switching device or the like that are operative to switch electrical command signal circuits for electromagnetic clutches. Here, the hydraulic pressure gradient represented by the vertical line in FIG. 34 is replaced by the electrically controlled amount corresponding thereto.

In the first to third embodiments, the automatic transmission portion 20 connected to the differential portion 11 in series via the power transmitting member 18, a countershaft may be provided in parallel to the input shaft 14 to allow the automatic transmission portion 20 to be coaxially disposed on an axis of the countershaft. In this case, the differential portion 11 and the automatic transmission portion 20 may be connected to each other in power transmissive state via a set of transmitting members structured of, for instance, a counter-gear pair acting as the power transmitting member 18, a sprocket and a chain.

Further, the power distributing mechanism 16 as the differential mechanism of the first to third embodiments may include, for instance, a pinion rotatably driven with the engine, and a pair of bevel gears held in meshing engagement with the pinion, are operatively connected to the first electric motor M1 and the power transmitting member 18 (second electric motor M2).

The power distributing mechanism 16 of the first to third embodiments having been described above as including one set of planetary gear units, may include two or more sets of planetary gear units that are arranged to function as a transmission having three or more speed positions under a non-differential state (fixed shifting state). In addition, the planetary gear unit is not limited to the single-pinion type, but may be of a double-pinion type.

Following structure can be adopted. When the power distributing mechanism 16 is comprised of two or more sets of planetary gear units, the engine 8, first and second electric motors M1 and M2, and power transmitting member 18 can be connected to each of rotary elements of the power distributing mechanism 16 in the power transmissive state, and the output member 22 can be connected thereto in the power transmissive state depending on the structure. Further, the step variable shifting and the continuously variable shifting state can be switched by controlling the clutch C and brake B connected to each of rotary elements of the planetary gear unit.

In the first to third embodiments, although the engine 8 and the differential portion 11 are directly connected with each other, such connecting mode is not essential. The engine 8 and the differential portion 11 can be connected via the clutch etc.

In the shifting mechanism 10 of the first to third embodiments, the first electric motor M1 and the second rotary element RE2 are directly connected, and the second electric motor M2 and the third rotary element RE3 are directly connected. However, the second electric motor M2 and the third rotary element RE3 can be indirectly connected via the engaging element such as the clutch.

In the first to third embodiments, the differential portion 11 and the automatic shifting portion 20 are connected to each other in series in the structure shown FIG. 1. However, the present invention can be applied to a structure even if the differential portion 11 and the automatic shifting portion 20 are mechanically independent from each other, provided that a whole of the shifting mechanism 10 has a function to achieve an electrically controlled differential action enabling a differential state to be electrically varied, and a function to perform a shifting on a principle different from the function of the electrically controlled differential action. In summary, the automatic shifting portion 20 is sufficiently provided to form the part of the power transmitting path extending from the engine 8 to the drive wheel 38.

In the first to third embodiments, the second electric motor M2 is directly connected to the power transmitting member 18 forming the part of the power transmitting path extending from the engine 8 to the drive wheel 38 in the first to third embodiments. However, it may be indirectly connected to the power transmitting member 18 via a transmission or the like. In the shifting mechanism 10, the second electric motor M2 is connected to the power transmitting member 18 and can be connected to the power distributing mechanism 16 via the engaging device such as the clutch. Therefore, the shifting mechanism 10 can be constructed such that the second electric motor M2, instead for the first electric motor M1, controls the differential state of the power distributing mechanism 16.

The automatic shifting portion 20 serving the step-variable automatic transmission in the first to third embodiments, may include a continuously variable CVT.

The first to third embodiments may be implemented in a mutually combined form upon providing, for instance, a priority order.

What is claimed is:

1. An engine start-up device for a hybrid vehicle power transmitting device, wherein
the hybrid vehicle power transmitting device comprises (i) an electrically controlled differential portion having a differential mechanism and controlling an operating state of a first electric motor connected to the differential mechanism in a power transmissive state for thereby controlling a differential state of the differential mechanism, (ii) a shifting portion forming part of a power transmitting path to function as an automatic transmission, and (iii) a second electric motor connected to the power transmitting path;
the engine start-up device starts up an engine using a first method of starting the engine during a non-shifting of the shifting portion, and starts up the engine using a second method of starting the engine during a shifting of the shifting portion, the first method being different from the second method; and
In a condition that the engine start-up is performed during the shifting of the shifting portion, the engine start-up device accelerates a completion timing of the shifting and an ignition initiation timing of the engine in comparison to a condition when the engine start-up is not performed during the shifting of the shifting portion.

2. The engine start-up device for the hybrid vehicle power transmitting device according to claim 1, wherein the electrically controlled differential portion has an input shaft to which the engine is connected in a power transmissive state; and during the non-shifting of the shifting portion, the engine start-up device causes a rotation speed of the engine for start-up thereof to increase by using either one of the first and second electric motors.

3. The engine start-up device for the hybrid vehicle power transmitting device according to claim 2, wherein during the shifting of the shifting portion, the engine start-up device causes the rotation speed of the engine for start-up thereof to increase by using both the first and second electric motors.

4. The engine start-up device for the hybrid vehicle power transmitting device according to claim 1, wherein the electrically controlled differential portion has an input shaft to which the engine is connected in a power transmissive state; and during the shifting of the shifting portion, the engine start-up device causes a rotation speed of the engine for start-up thereof to increase by using both the first and second electric motors.

5. The engine start-up device for the hybrid vehicle power transmitting device according to claim 1, wherein the engine start-up device causes the electrically controlled differential portion to operate as a continuously variable shifting mechanism upon controlling an operating state of the first electric motor.

6. An engine start-up device for a hybrid vehicle power transmitting device, wherein
the hybrid vehicle power transmitting device comprises (i) an electrically controlled differential portion having a differential mechanism and controlling an operating state of a first electric motor connected to the differential mechanism in a power transmissive state for thereby controlling a differential state of the differential mechanism, (ii) a shifting portion forming part of a power transmitting path to function as an automatic transmission, and (iii) a second electric motor connected to the power transmitting path;
the engine start-up device, when increasing a rotation speed of an engine for starting up the engine, sets an output torque of the second electric motor at a first output torque during a non-shifting of the shifting portion, and sets the output torque of the second electric motor at a second output torque during a shifting of the shifting portion, the first output torque being different from the second output torque; and
In a condition that the engine start-up is performed during the shifting of the shifting portion, the engine start-up device accelerates a completion timing of the shifting and an ignition initiation timing of the engine in comparison to a condition when the engine start-up is not performed during the shifting of the shifting portion.

7. The engine start-up device for the hybrid vehicle power transmitting device according to claim 6, wherein during the shifting of the shifting portion, the engine start-up device causes the output torque of the second electric motor to be greater than that relevant to the non-shifting of the shifting portion.

8. The engine start-up device for the hybrid vehicle power transmitting device according to claim 6, wherein the engine start-up device causes the electrically controlled differential portion to operate as a continuously variable shifting mechanism upon controlling an operating state of the first electric motor.

* * * * *